United States Patent [19]
McGrath

[11] Patent Number: 5,513,055
[45] Date of Patent: Apr. 30, 1996

[54] MOTOR SUPPORT ASSEMBLY FOR A DISK DRIVE

[75] Inventor: Michael C. McGrath, Pleasanton, Calif.

[73] Assignee: Avatar Systems Corporation, Milpitas, Calif.

[21] Appl. No.: 975,530

[22] Filed: Nov. 9, 1992

[51] Int. Cl.⁶ .................................................. G11B 17/02
[52] U.S. Cl. .................................... 360/99.08; 360/97.01; 360/98.07
[58] Field of Search ............................. 360/99.06–99.07, 360/99.08, 99.02–99.03, 98.07, 133, 97.01; 369/77.2, 291

[56] References Cited

U.S. PATENT DOCUMENTS

| | | | |
|---|---|---|---|
| 4,646,285 | 2/1987 | Ogusu et al. | 360/133 X |
| 4,791,515 | 12/1988 | Tanaka et al. | 360/135 X |
| 4,823,214 | 4/1989 | Davis | 360/99.06 X |
| 4,965,685 | 10/1990 | Thompson et al. | 360/97.01 |
| 5,216,558 | 6/1993 | Griffith et al. | 360/99.02 X |

*Primary Examiner*—John H. Wolff
*Attorney, Agent, or Firm*—Pillsbury Madison & Sutro

[57] ABSTRACT

A support assembly for the motor of a removable cartridge disk drive which positively elevates and retracts the spindle thereof for connection and disconnection from the hub of the disk without requiring electrical power for the operation. The support assembly includes a pair of cams on siding members to provide the movement.

43 Claims, 15 Drawing Sheets

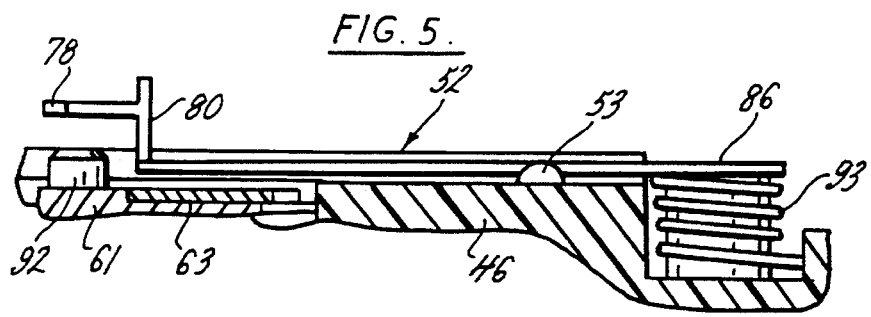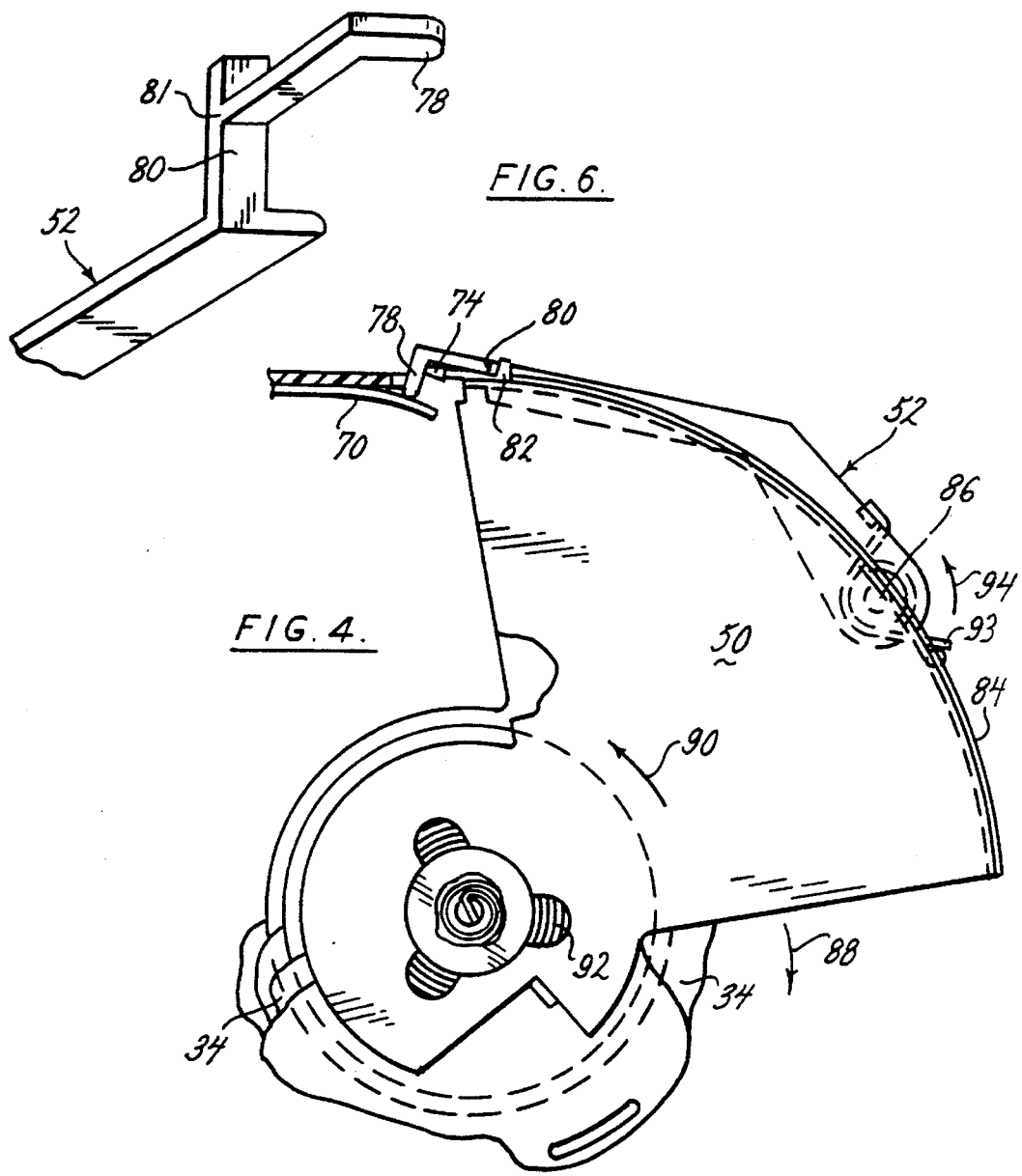

MOTOR SUPPORT ASSEMBLY FOR A DISK DRIVE

FIELD OF THE INVENTION

The present invention relates to small, low power and fast, disk drives for data storage on disks enclosed in cartridges that can be inserted and removed from the disk drives by the user.

BACKGROUND OF THE INVENTION

Disk drives for removable magnetic and optical disks have been available for some time. Magnetic disks generally come in a flexible form known as floppies, or a relatively rigid form known as hard disks, whereas optical disks are embodied in relatively rigid media. Typical flexible disk drives and cartridges are shown in U.S. Pat. Nos. 4,445,155 to Takahashi, et al.; 4,445,174 to Takahashi; 4,546,397 to Asami, et al; 4,573,093 to Obama, et al; and 4,675,758 to Tanaka. Typical removable hard disk drives and the cartridges therefor are shown in U.S. Pat. Nos. 4,488,187 to Alaimo; 4,503,474 to Nigam; 4,504,879 to Toldi, et al.; 4,683,506 to Toldi, et al.; 4,717,981 to Nigam, et al; 4,722,012 to Toldi, et al.; 4,864,452 to Thompson, et al.; 4,870,518 to Thompson, et al.; 4,864,437 to Couse, et al.; 4,920,462 to Couse, et al.; 4,965,685 to Thompson, et al.; and 4,965,691 to Iftikar, et al. Disk drives having removable disks usually have some sort of entry door and a mechanism to receive a disk cartridge when it is inserted into the drive to assure proper connection therebetween. Most of such disk drives include a motor or solenoid which, after actuation by partial manual insertion of the disk cartridge, draws the cartridge into the drive, moves a shutter to open a window for access to the disk and positions read/write heads on one or both sides of the disk for data reading and writing. When a floppy disk or an optical disk is involved, usually the heads are driven linearly, such as by a stepper motor or linear voice coil actuator, whereas when a hard disk is involved, a linear actuator may be used or the heads may be moved arcuately across the disk by a rotary voice coil actuator. In floppy disk drives, the heads are designed to lightly touch the magnetic media during reading and writing. In optical drives, the read/write heads are spaced a safe distance away from the disk, laser beams being used in most instances to read and write the optical information. In magnetic hard disks, the read/write heads float on an extremely thin layer of air so they never touch the disk while the disk is spinning. Unlike floppy disks which wear out after a short use time, this allows hard disks to last the lifetime of the computer to which they are connected. Dust or other contamination, if it is the correct size, can get between the read/write heads and the disk and cause damage to the magnetic media of a hard disk. For that reason, nonremovable hard disk drives are sealed. In removable cartridge hard disk drives, means must be provided to minimize contamination, especially in the size of 0.1 to 4 microns, because particles smaller than that pass between the disk and a head in the layer of air and particles larger than that tend to be knocked out of the way by the head.

Generally, the requirements for a hard disk cartridge are: protect the disk from damage and contamination; provide access for the read/write heads on both sides of the contained disk; provide a positive rotational interface to the disk drive for spinning the disk; provide sufficient rigidity to assure that all but extreme stresses do not cause the cartridge housing to bend and come in contact with the disk; provide some sort of mechanism to open the contamination preventing shutter of the cartridge when the cartridge is inserted into the disk drive and to close the shutter as the cartridge is being ejected; and do all of this in a minimum volume. Heretofore, most removable hard disks have been available in a cartridge about 6" square and over ½ "thick. The disk drive must accommodate the cartridge internally for contamination control. Therefore, removable cartridge disk drives must be proportionately larger than those with nonremovable disks, since removable cartridge disk drives have been too big to serve as internal disk drives in lap top or notebook size computers. Also, prior art removable cartridge disk drives, with their ejection system motors and disk retaining solenoids, use a relatively large amount of power when compared to small, efficient, sealed hard drives.

Therefore, there has been a need to provide a hard drive with very low power requirements, which uses removable cartridges having minimal size so that it can physically fit in available space in lap top and notebook sized personal computers and not reduce the battery powered operating life thereof, while being lightweight, fast, reliable, economical to manufacture, rugged and capable of storing large amounts of data.

SUMMARY OF THE INVENTION

The present invention is a motor support assembly for a small, thin, high density, removable cartridge hard disk drive, especially adapted for use in lap top and notebook computers. The hard drive needs very little power and allows storage of at least 100 megabytes of data on a disk contained in a generally rectangular cartridge about 2¾" wide×3" deep×³⁄₁₆" thick, while providing 10 millisecond average access times. The prototype units of the drive are a mere 2¹³⁄₁₆" wide×3¹⁵⁄₁₆" deep×½" thick, and in fact, are so small, they can be piggybacked along with a 34" floppy disk drive in the normal 1" floppy slot in a desk top personal computer.

The cartridge includes a housing that surrounds and protects a disk mounted inside the housing. The housing includes a window to allow access to the disk by read/write heads, a shutter to close the window except when the cartridge is in a disk drive and a hole on one side to provide access to a disk hub used to spin the disk. The shutter is spring loaded to its closed position. A shutter lock makes sure that the shutter is opened only when the cartridge is in a disk drive.

The present disk drive includes a mechanical cartridge insertion and ejection mechanism, which requires insignificant amounts of electrical power because when a cartridge is manually inserted, the insertion and ejection mechanism stores energy mechanically, which is then used for ejection. When a cartridge is inserted into the disk drive, the shutter on the cartridge is engaged by a shutter opener arm, which unlocks the shutter and rotates it back to open the window so that the read/write heads can access the disk contained therein. Since both the shutter opener arm and the shutter are spring biased when in their fully ejected and closed positions, the manual insertion of the cartridge causes energy to be stored in both springs.

As the cartridge is inserted, it contacts an insertion pin connected to linkage. Further manual insertion of the cartridge forces the insertion pin in an arcuate path, which through connecting linkage stores additional spring energy. When the cartridge is fully inserted in the disk drive, linkage in the form of sliding cams lifts a drive motor with its connected spindle, up into a magnetic engagement with the hub of the disk. At the same time, a rotary voice coil actuator, with its connected actuator arms and read/write heads, is freed to move off a pair of parking ramps by the disengagement of an actuator arm lock lever connected to the insertion/ejection linkage and a cam on the rotary voice coil actuator. At any other time, the actuator is immobilized by the actuator arm lock lever and cam, and the pair of ramps on which the actuator arms normally rest.

When normal ejection of the cartridge is desired, software commands or an eject button is used. The actuator arms are retracted to the parking ramps and a short electrical pulse as small as one millisecond is applied to a trigger magnet. The trigger magnet responds by releasing a portion of the linkage, unlatching the spring force therein, which lowers the motor disconnecting the spindle from the hub. Thereafter, the linkage applies the force of loaded springs through the insertion pin to the cartridge to eject it. Toward the end of the cartridge ejection cycle, a return spring reconnects the trigger magnet to the linkage. The spring forces stored in the shutter opener arm and the shutter, also assist in ejecting the cartridge. The entire normal insertion and ejection process needs only a one millisecond pulse of electrical power.

If power is suddenly removed from the disk drive when it is in operation, the back electromotive force (EMF) of the spinning motor is used to retract the actuator arms. If desired, the back EMF can also be used to produce the ejection pulse to the trigger magnet.

The linkage can also be unlatched mechanically through the use of a straightened paper clip or other pin-like device inserted through an emergency eject hole positioned in the bezel on the front of the drive. The inserted pin is used to move a portion of the linkage, causing it to unlatch even though the trigger magnet has not been energized.

Thus, it is an object of the present invention to provide a high density removable cartridge data storage device in a minimal envelope.

Another object is to provide a hard disk drive which has no power-hungry solenoids or drive motors in its insertion/ejection mechanism.

Another object is to provide a removable cartridge disk drive for portable computers that includes positive means to move and park the read/write heads thereof off of any disk inserted therein and to lock the actuator arm thereof in such position when the cartridge is ejected.

Another object is to provide a light weight removable cartridge hard disk drive which is relatively economical to manufacture and assemble.

Another object is to provide a small, high density, removable cartridge disk drive that is extremely reliable even when used in dusty environments and under conditions that produce impact loads thereto.

These and other objects and advantages of the present invention will become apparent to those skilled in the art after considering the following detailed specification, together with the accompanying drawings, wherein:

BRIEF DESCRIPTION OF THE DRAWINGS

FIG. 4 is an enlarged detailed view showing the interface between the shutter opener arm of the disk drive and the shutter of a cartridge as the shutter first contacts the opener arm;

FIG. 5 is a side detailed view of the shutter opener arm over a retracted motor drive spindle in position to engage a closed shutter;

FIG. 6 is an enlarged perspective view of the tip of the shutter opener arm of FIG. 5;

FIG. 15 is a side view similar to FIGS. 10A, 10B and 10C of the slides as they are retracting the motor;

DETAILED DESCRIPTION OF THE SHOWN EMBODIMENTS

Figure 1:
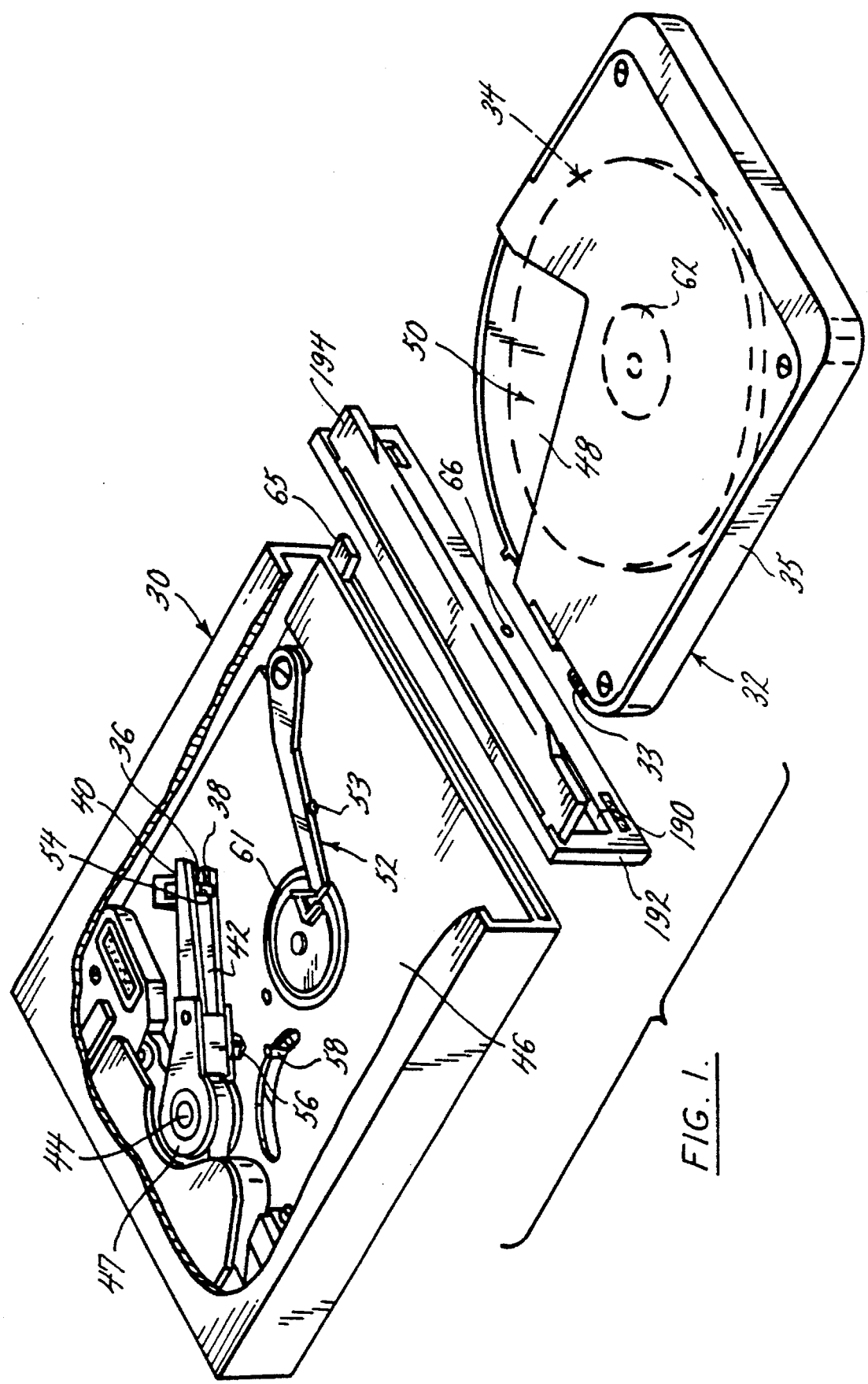
FIG. 1 is a partially cut away perspective view of a disk drive system of the present invention, including a cartridge positioned for insertion into the disk drive thereof.

Referring to the drawings more particularly by reference numbers, number 30 in FIG. 1 refers to a removable cartridge disk drive constructed according to the present invention. A removable cartridge 32 is positioned for insertion therein. Such drives 30 and cartridges 32 are use to store digital data in magnetic media. Although the disk drive 30 and the cartridge 32 are shown in their normal horizontal positions, and hereinafter unless otherwise stated, such positioning is assumed, the disk drive 30 and the cartridge 32 can be used in any orientation with respect to gravity. They are designed to be used in notebook or lap top computers. In such computers, it is desirable that peripherals, like the present disk drive take up minimal volume, are extremely tolerant to impacts, and because such computers are commonly called upon to operate on battery power, use little electrical power.

The cartridge 32 includes a write protect slide 33 and a disk 34, which is surrounded by a housing 35 to prevent physical damage or contamination thereof. Since data is placed on very small areas of the disk 34 with great precision, contamination, which damages the magnetic media thereon, can quickly destroy the disk 34. Therefore, the housing 35 is designed to completely enclose the disk 34 when the cartridge 32 is outside the drive 30 and exposed to the elements. However, for use, the disk 34 must be accessible to read/write heads 36 and 38 in the drive 30. The heads 36 and 38 are positioned at the ends of actuator arms 40 and 42, respectively, which rotate together about a pivot 44 on the base 46 of the drive 30 and are driven by a rotary voice coil actuator 47.

Figure 2A:
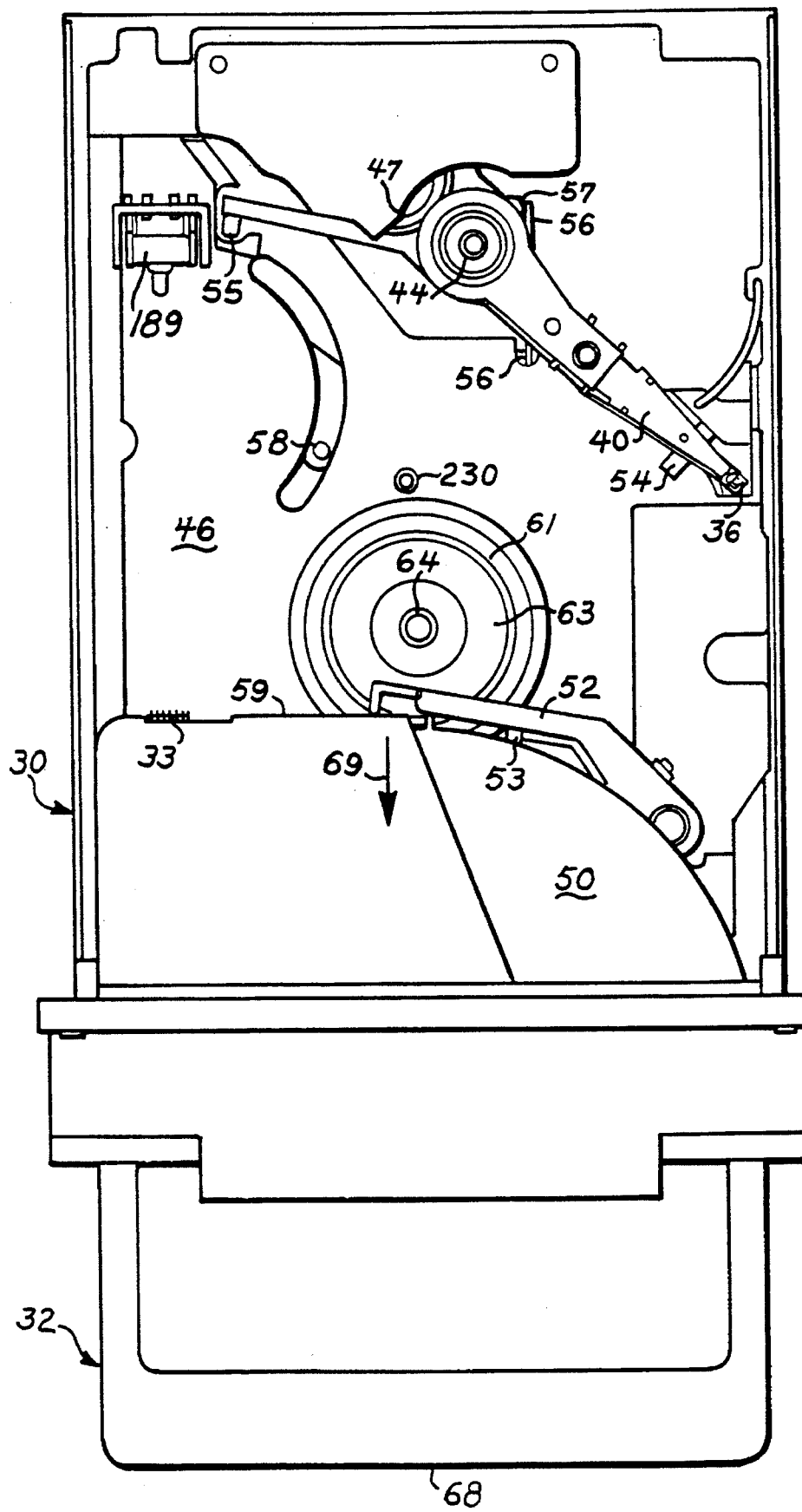
FIG. 2A is a top plan view of the disk drive of FIG. 1, with the top cover removed and a cartridge partially inserted therein.
Figure 2B:
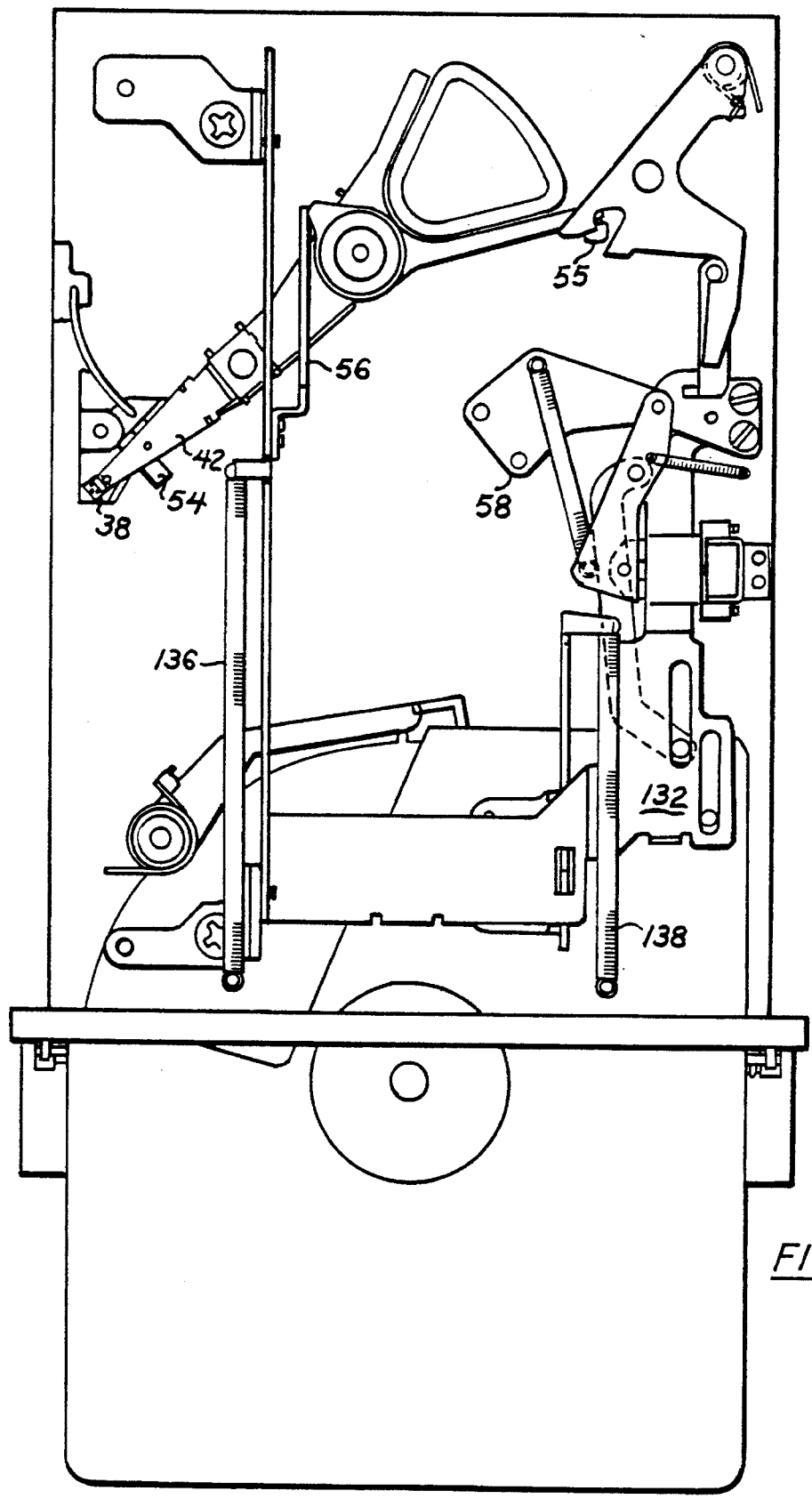
FIG. 2B is an underside plan view of the major components of the disk drive and cartridge of FIG. 2A.
Figure 3:
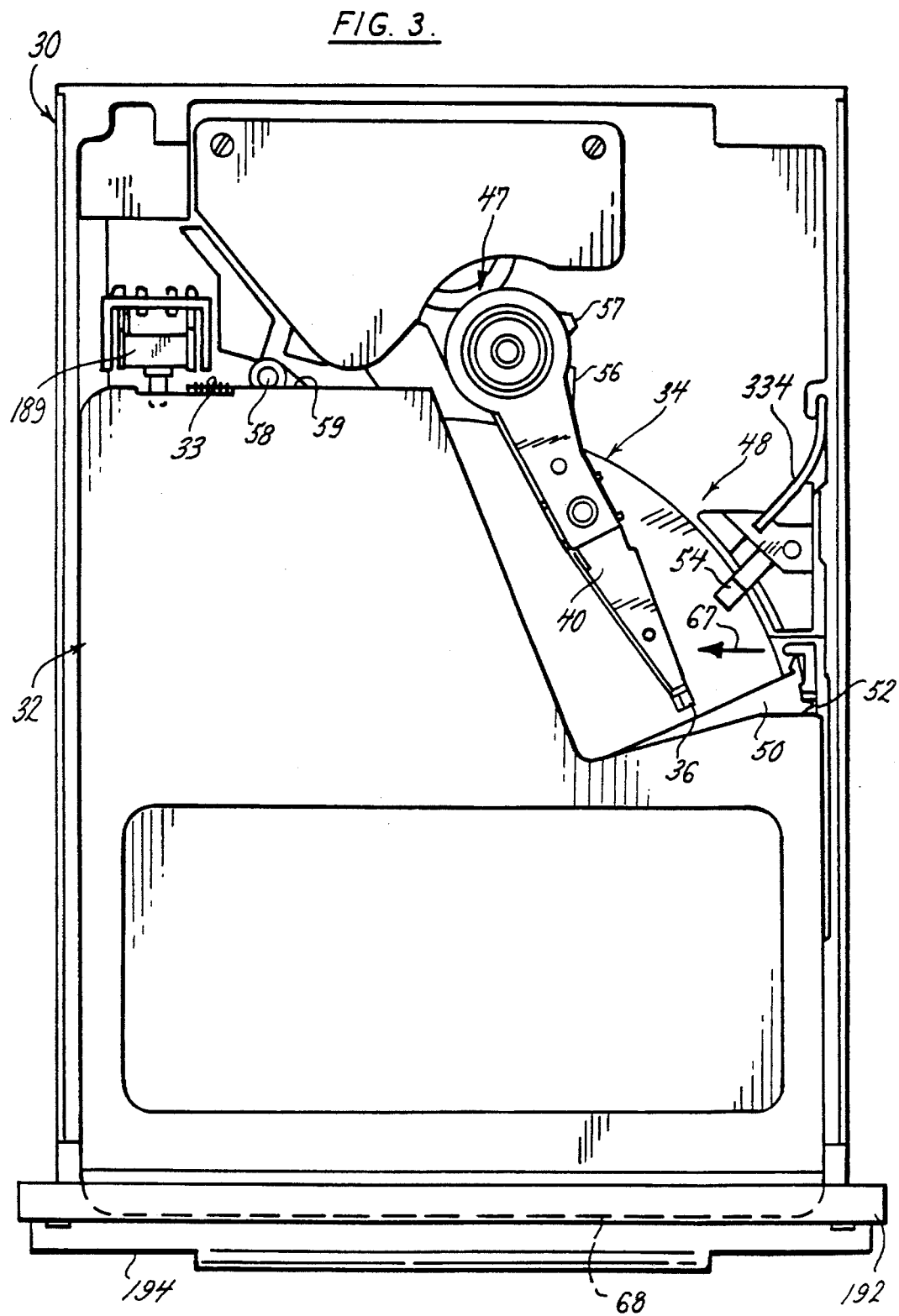
FIG. 3 is a top plan view similar to FIG. 2A with the cartridge fully inserted in the disk drive and the read/write heads thereof in position to read or write data.

A window 48 in one corner of the housing 35 provides access to the disk 34 for the read/write heads 36 and 38. The window 48 normally is covered by a shutter 50 when the cartridge 32 is outside the drive 30. The shutter 50 is biased towards a closed position and locked closed when out of the drive 30. As shown in FIGS. 2A, 2B and 3, the shutter 50 is automatically opened during insertion and closed during ejection of the cartridge 32 by a shutter opener arm 52. The shutter opener arm 52 normally is biased against a stop 53, so that it tends to remain in the ready position shown in FIGS. 1, 2A and 2B to engage the shutter 50.

When the cartridge 32 is in a partially inserted position, the shutter opener arm 52 engages and unlatches the shutter 50. Further insertion opens the shutter 50 as the cartridge 32 moves to the position shown in FIG. 3. When the shutter 50 has been opened, the actuator arms 40 and 42 can position the heads 36 and 38 at the proper positions on the disk 34 for read and/or write operations. It should be noted that when not in use, the arms 40 and 42 are parked on a double-sided ramp 54 to prevent damage thereto due to impact. The ramp 54 straddles the disk 34 when the cartridge 32 is fully inserted. The arms 40 and 42 are releasably retained on the ramp 54 by a magnet 55 which attracts the actuator 47. The arms 40 and 42 are balanced about their pivot 44 by the actuator 47 so impacts to the drive 30 cannot create enough torque to disconnect the actuator 47 from the magnet 55.

When a cartridge 32 is not in the drive 30, the arms 40 and 42 are locked on the ramp 54 by a retention lever 56. The lever 56 contacts a cam 57 on the actuator 47 to maintain the arms 40 and 42 on the ramp 54 in the locked positions shown until the cartridge 32 is nearly fully inserted in the disk drive 30. The drive 30 includes an upstanding insertion pin 58 positioned for engagement with the back edge 59 of the housing 35. When the insertion pin 58, which is linked to the lever 56 through linkage to be explained hereinafter, is moved by contact with the back edge 59, the lever 56 moves out of its locking position.

Once the cartridge 32 is fully inserted within the drive 30, the drive motor 60 and its spindle 61 are lifted into engagement with the hub 62 of the disk 34. The spindle 61 includes a magnetic insert 63 and the hub 62 is constructed from material susceptible to magnetic attraction. The insert 63 is concentric to a cylindrical spindle protrusion 64 defining the center of the spindle 61. Therefore, when the spindle 61 is raised, it magnetically engages the hub 62. Thereafter, the motor 60 rotates the disk 34 as is required for operation.

The cartridge 32 can be ejected from the drive 30 by software commands, through the use of a manual eject button 65, or by inserting a pin in an emergency eject hole 66 to directly move the release mechanism within the drive 30. When cartridge ejection is started, spring energy stored while the cartridge 32 was inserted, is applied to the insertion pin 58, which moves the cartridge 32, partially out of the drive 30 to a position where it can be manually removed therefrom. The ejection is also assisted by spring energy stored when the shutter 50 and the shutter opener arm 52 were pivoted during insertion. The force angles of the shutter 50 and the shutter opener arm 52 shift from sidewardly, shown by arrow 67 (FIG. 3) when the cartridge 32 is fully inserted, to forwardly toward the front edge 68 of the cartridge 32, as shown by arrow 69 (FIG. 2A), as the cartridge 32 is ejected. Therefore, the stored energy of the arm 52 and the shutter 50 is applied as an ejection force, mostly near the end of the ejection cycle.

The normal position for the shutter 50 is closed as shown in FIGS. 2A, 2B and 4. The shutter 50 is maintained closed by the interaction between a spring catch member 70 and an abutment surface 72 on a pawl 74, which extends from the front edge 76 of the shutter 50. Just after the cartridge 32 reaches the position shown in FIGS. 2A and 2B, a finger 78 on the end of the shutter opener arm 52 depresses the spring member 70 out of engagement with the abutment surface 72 of the pawl 74, to unlock the shutter 50. At the same time, an upstanding lever portion 80, a midpoint 81 from which the finger 78 extends, engages a buttress 82 on the outer periphery 84 of the shutter 50. Further insertion of the cartridge 32 causes the arm 52 to rotate about its pivot 86 to rotate the shutter 50 in the direction of arrow 88 to open the window 48. The shutter 50 is biased to its closed position shown in FIG. 4 in the direction of arrow 90 by a spring 92 acting between the shutter 50 and the housing 35, while the shutter opener arm 52 is biased by a spring 93 in the direction of arrow 94. The combined forces of the springs 92 and 93 act in the direction of the arrow 69 (FIG. 2) early in an insertion or late in an ejection, but act sidewardly in the direction of arrow 67, when the cartridge 32 is fully inserted into the disk drive 30. This change in force direction results in almost none of the forces, applied by the stressed springs 92 and 93, tending to eject the cartridge 32 when it is fully inserted.

Figure 7:
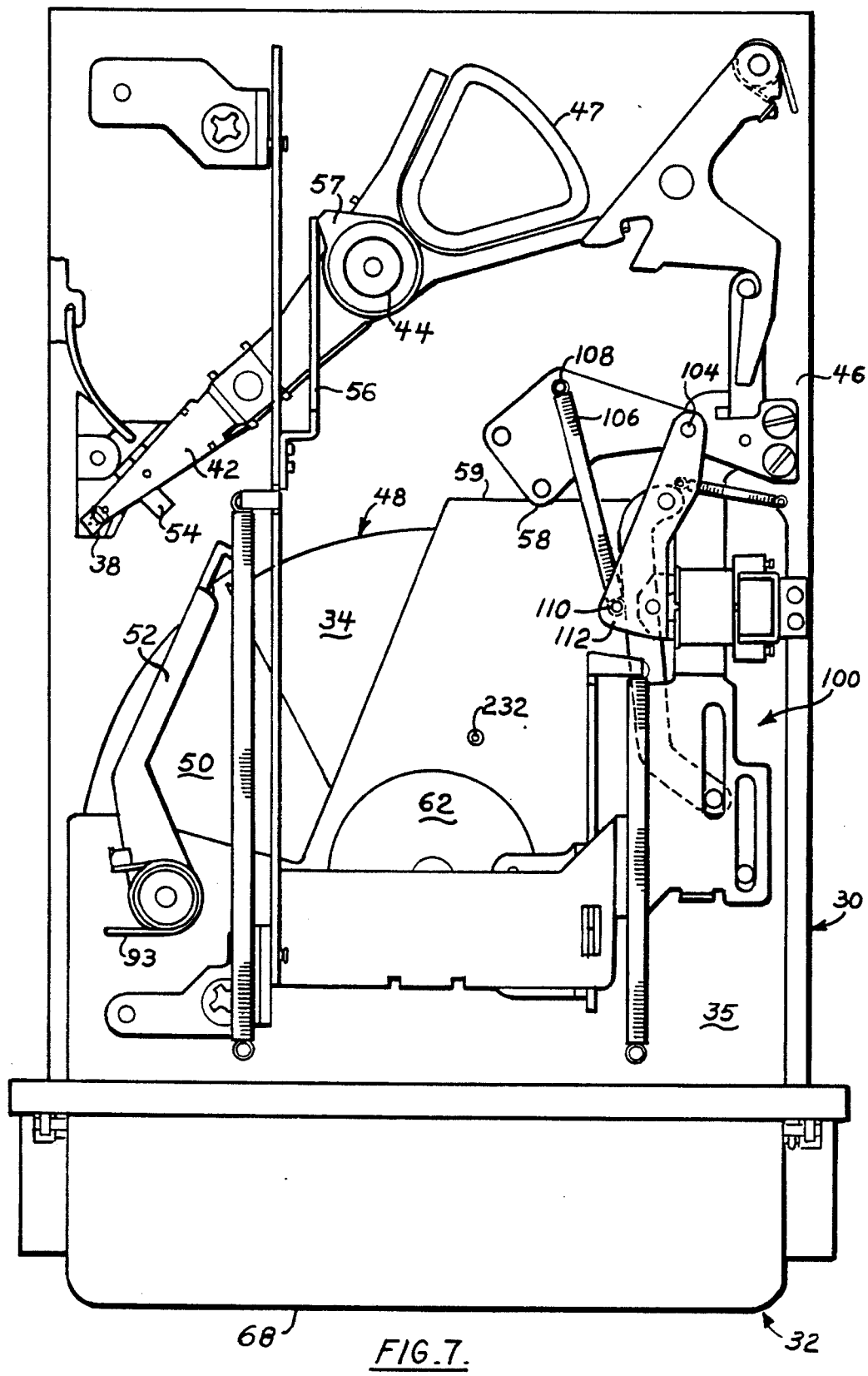
FIG. 7 is an underside plan view of the insertion/ejection mechanism of the present invention just as it engages the cartridge during insertion.

The underside of the disk drive 30 is shown in FIG. 7 in a position with the shutter 50 partially open and the back edge 59 of the housing 35 just touching the insertion pin 58. The motor 60 and the portion of the base 46 between the cartridge 32 and the insertion/ejection mechanism 100 have been removed for clarity.

Figure 8:
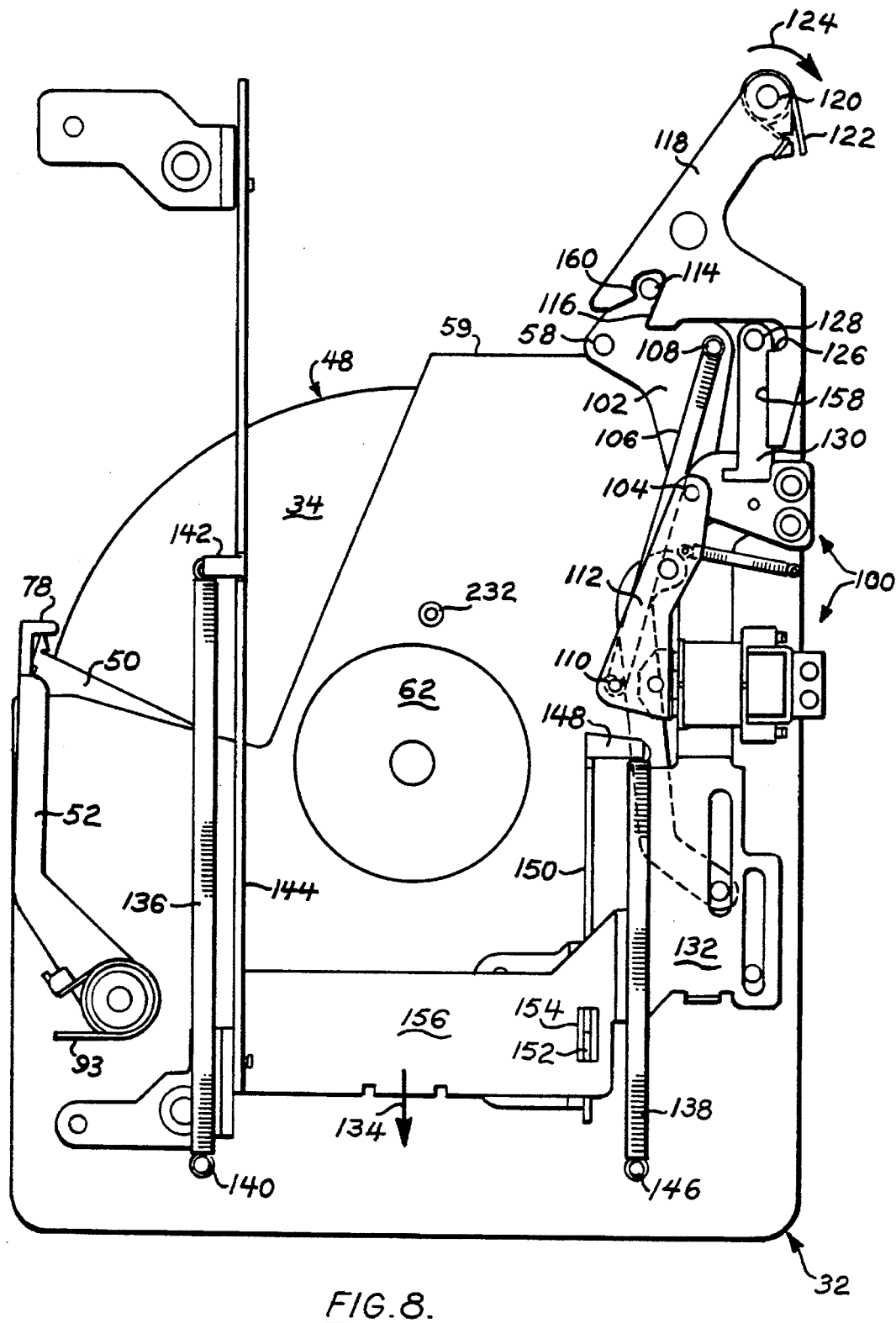
FIG. 8 is an underside plan view of the insertion/ejection mechanism of the present invention, partially through a cartridge insertion cycle.

The mechanism 100 includes an insertion lever 102, which supports the pin 58 and rotates about an insertion lever pivot 104. The lever 102 is normally held in the position shown by a relaxed load spring 106, which extends between a pin 108 on the insertion lever 102 and a pin 110 on an eject lever 112. The load spring 106 is wound to have a fairly high initial tension, so that as the inward movement of the cartridge 32 rotates the lever 102 about the pivot 104, the resistance to insertion and hence the amount of energy stored by the spring 106 starts relatively high, increases and then decreases, because of the leverage effect of the lever 106 as it reaches its fully inserted position shown in FIG. 8.

When the cartridge 32 reaches its fully inserted position, where it is supported by the side surface 113 of the base 46, a latch pin 114 of the lever 102 contacts a latch abutment surface 116 of a latch member 118. The latch member 118 is mounted for rotation about a pivot 120, which also includes a pivot spring 122 biasing the latch member 118 in the direction of arrow 124. The force applied between the latch pin 114 and the latch abutment surface 116 overcomes the force of the spring 122, causing the latch member 118 to rotate in the direction opposite to arrow 124 allowing a control notch 126 to release a latch control pin 128.

The latch control pin 128 is connected to an arm 130 of a slide member 132. The slide member 132 is biased in the direction of arrow 134 by left and right slide springs 136 and 138. The left side spring 136 acts directly between a pin 140 connected to the base 46 and a spring arm 142 extending from the left slide portion 144 of the slide member 132, while the right side spring 138 is stretched between a pin 146 connected to the base 46 and the spring arm 148 of a right slide member 150. The right slide member 150 includes a tab 152 which extends into a slot 154 of the cross portion 156 of the slide member 132 so that there can be slight relative motion between the right slide member 150 and the left slide portion 144 to allow manufacturing tolerances in the mechanism 100.

Once the pin 128 is released from the notch 126, it slides along a latch member maintaining abutment surface 158, which prevents rotation of the latch member 118 back in the direction of arrow 124. An escapement notch 160 of the latch member 118 moves in front of the latch pin 114 to maintain it in the position shown in FIG. 9 with the load spring 106 fully stressed. The springs 136 and 138 force the slide member 132 in the direction of arrow 134. The slide member 132 is restrained to linear movement by a slot 162 formed therein and a shoulder screw 164 connected to the base 46, slide pins 166 and 168 extending from a support bracket 170 for engagement with a slot 172 formed in the right slide member 150, a slide bracket 73, and slide pins 174 and 176, which extend from support brackets 178 and 180, respectively, into slots 182 and 184 formed through the left slide portion 144. When the slide 132 has moved to the position shown in FIG. 9, a tab 186 activates a switch 188 to electrically indicate to the computer that a disk 34 is properly inserted in the drive. Another switch 189 is positioned to sense the position of the write protect slide 33. The slide 33 is shown in its write enabling position in FIG. 2A and its write preventing position in FIG. 3.

Figure 9:
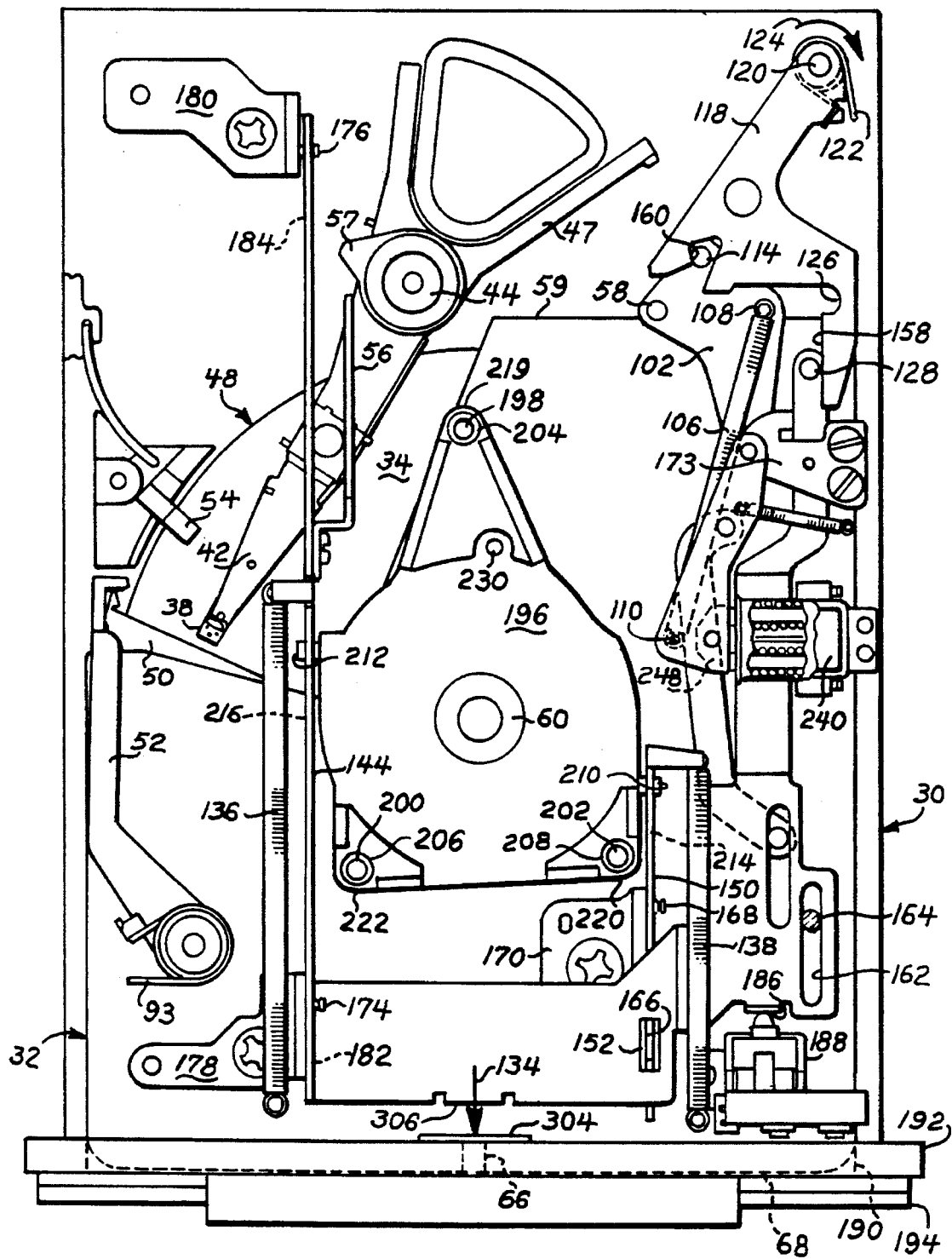
FIG. 9 is a view similar to FIG. 8, wherein the cartridge is fully inserted and the insertion/ejection linkage has moved to its latched position, with a rotary voice coil actuator released and reading or writing on a spinning disk.

As shown in FIGS. 7 and 9, the left slide portion 144 of the slide 132 is connected to the actuator arm lock lever 56. The lever 56 contacts the cam 57 on the rotary voice coil actuator 47 to maintain it in the retracted position shown in FIG. 7 with its arms 40 and 42 immobilized on the ramp 54. When the slide member 132 moves to the position shown in FIG. 9 after a cartridge 32 has been fully inserted in the disk drive 30, the actuator arm lock lever 56 disengages from the cam 57, allowing the rotary voice coil actuator 47 to freely rotate about its pivot 44. It should be noted that as shown in FIG. 9, the front edge 68 of the cartridge has passed fully in the entrance slot 190 in the bezel 192 of the drive 30, and that a spring loaded door 194 thereof, has closed to seal the environment inside the disk drive 30.

Figure 10:
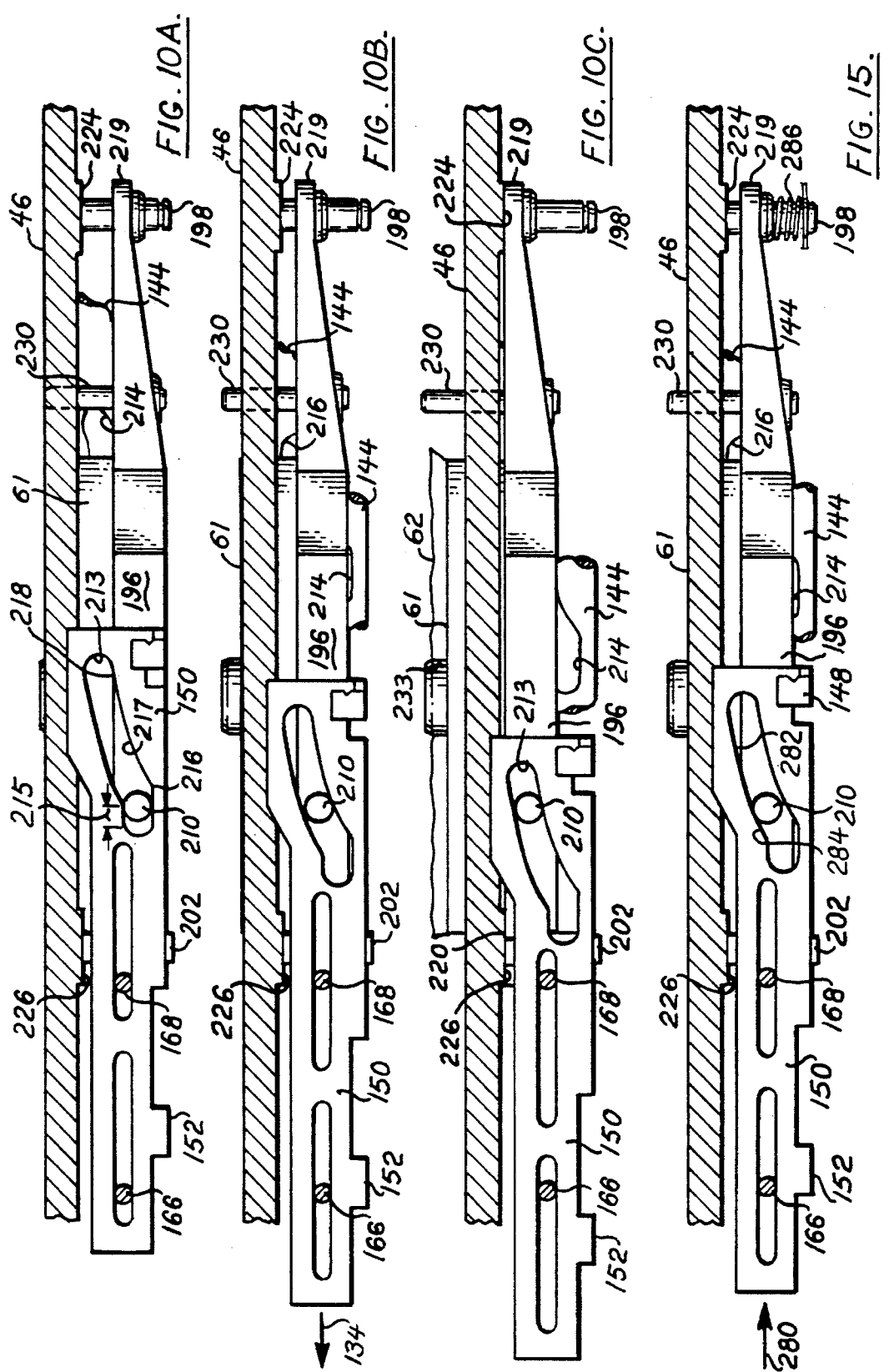
FIGS. 10A, 10B, and 10C are side views of the motor extend and retract slides of the disk drive of FIG. 9.

The motor 60 to spin the disk 34 about its common axis 195, is secured in a motor housing 196 mounted on three pins 198, 200 and 202 for vertical movement although only two are absolutely required. The pins 198, 200, and 202 extend from the opposite side surface 203 of the base 46. The pins 198, 200 and 202 are sized to loosely fit in the mounting holes 204, 206 and 208, respectively, through the housing 196. The housing 196 is moved vertically by a pair of sidewardly extending cam follower pins 210 and 212, which slide in cam slots 213 and 214 in the right slide member 150 and the left slide portion 144 and which extend from housing sides 196a and 196b respectively. The cam slots 213 and 214 are essentially identical, having an area 215 (FIG. 10A) that maintains the motor housing 196 in its retracted position, an abrupt transition 216 to an arcuate cam surface portion 217 which starts with a relatively high angled slope to lift the motor housing 196, and a slightly angled linear cam surface portion 218, so that as the left slide portion 144 and the right slide member 150 move in the direction of arrow 134, the cam follower pins 210 and 212, along with the motor housing 196, motor 60, and spindle 61 are forced from a retracted position shown in FIG. 10A, through the position shown in FIG. 10B, to the fully extended position shown in FIG. 10C with the spindle 61, magnetically engaged with the hub 62 of the disk 34 for spinning. The linear cam surface portion 218 is at a low angle to use mechanical advantage to seat the housing 196. Since the springs 136 and 138 act relatively independently on the left slide portion 144 and the right slide member 150, each pin 210 and 212 arranged at a diagonal to the pins 198, 200 and 202, assures that the foot pads 219, 220 and 222 of the housing 196 are fully down against matching pads 224, 226 and 228 on the base 46. At the same time, a locator pin 230 connected to the housing 196, extends through a hole 231 in the base 46 into a locator hole 232 in the cartridge 32 to locate the cartridge 32 precisely with respect to the spindle 61 and the hub 62 magnetically connected thereto and centered with the central orifice 233 of the hub 62 engaged with the cylindrical protrusion 64 of the spindle 61, so that the disk 34 can be freely spun within the housing 35 with minimal clearances.

Figure 11:
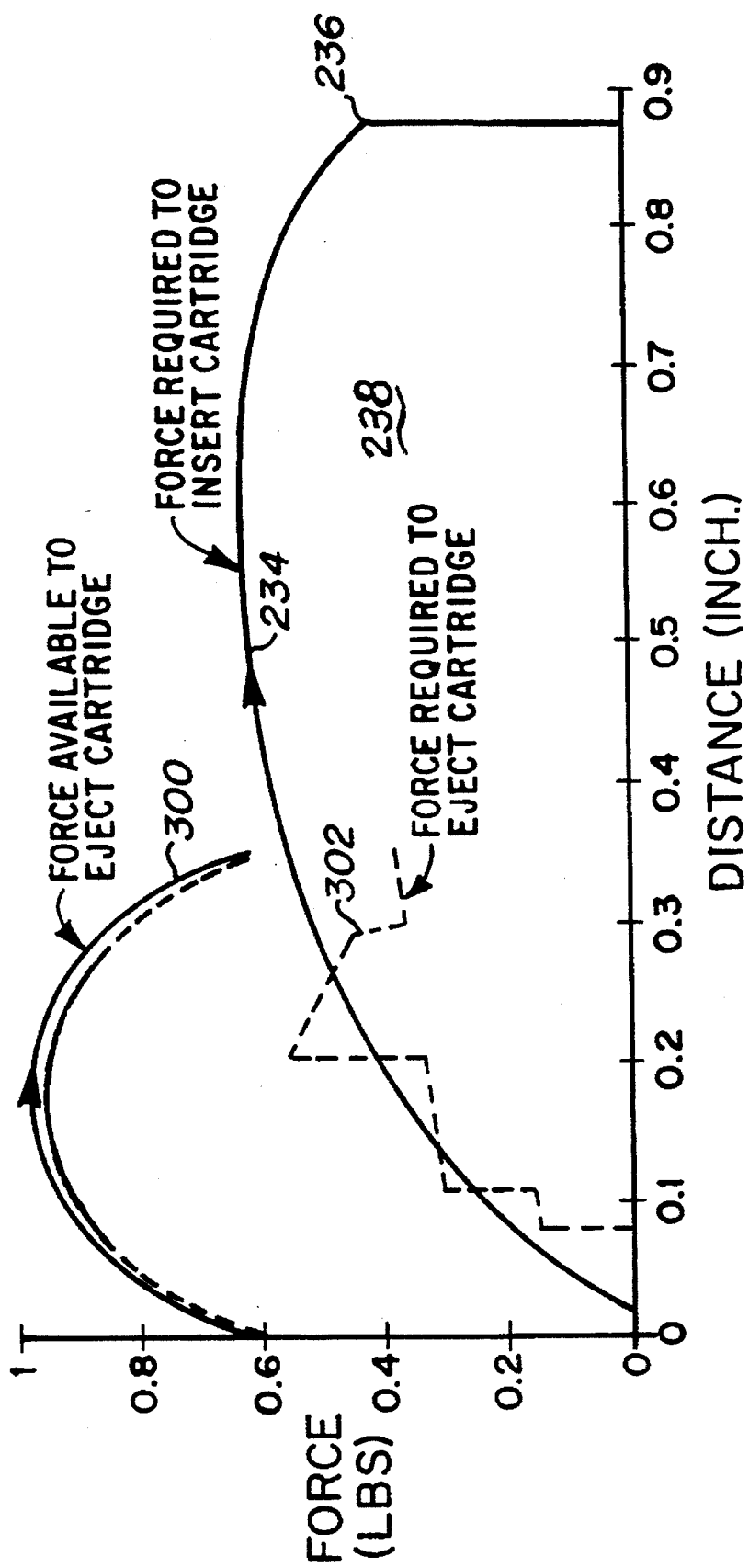
FIG. 11 is a graph of insertion and ejection forces versus cartridge position and ejection force versus slide position.

FIG. 11 is a graph of force caused by the mechanism 100 versus cartridge insertion distance. The curve 234 shows the force required to stress the mechanism when the cartridge 32 is inserted within the drive 30. The point 236 on the curve 234 is where the cartridge 32 is completely inserted. The area 238 underneath the curve 234 generally indicates the energy stored by the springs of the mechanism 100 when a cartridge 32 is inserted.

Figure 12:
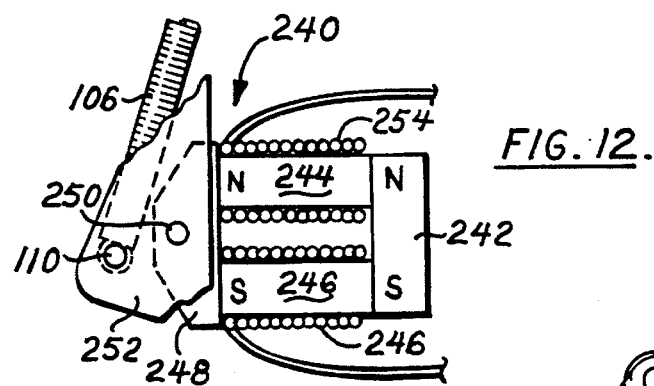
FIG. 12 is an enlarged detail view of a trigger magnet used to initiate ejection of a disk cartridge.

When the cartridge 32 is to be ejected either under software control or by depression of the manual eject button 65, the actuator arms 40 and 42 are retracted onto the double sided ramp 54 and magnetically restrained in that position by the magnet 55. Thereafter a very short pulse of electricity is provided to a trigger magnet 240. The interior details of the trigger magnet 240 are shown in FIG. 12. It includes a permanent magnet 242 which normally magnetizes a pair of pole pieces 244 and 246 to attract and retain an armature 248 which is mounted by a pin 250 for slight pivoting movement with respect to an eject lever 252. Each of the pole pieces 244 and 246 include a coil 254 and 256 respectively, wound thereabout. When the electrical pulse of the proper polarity is applied to the coils 254 and 256, they generate a magnetic field in the poles 244 and 246 opposite to that generated by the permanent magnet 242 to release the armature 248.

Figure 13:
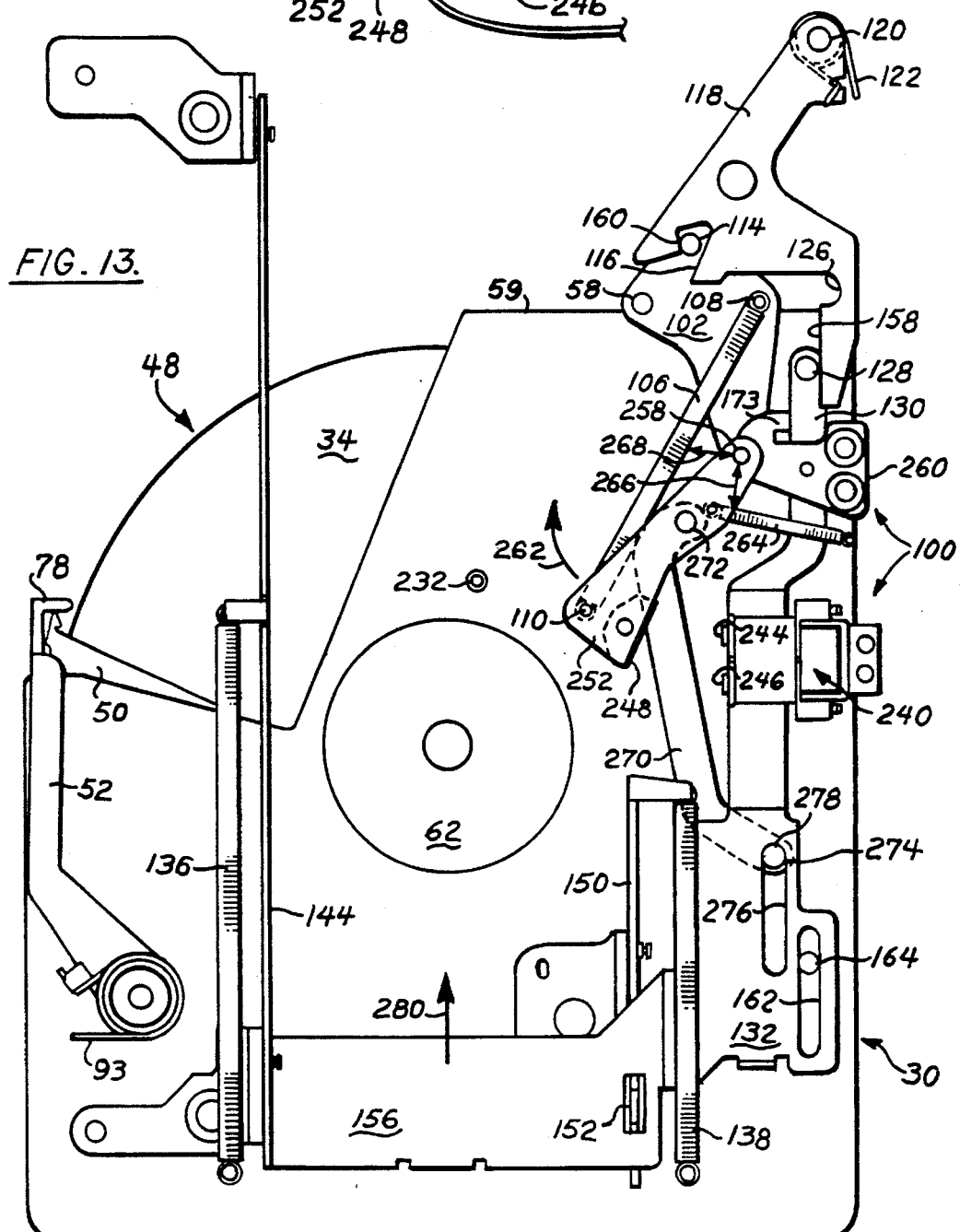
FIG. 13 is a bottom plan view of the insertion/ejection mechanism just after its trigger magnet has released an eject lever to start the ejection process.

When released, the eject lever 252 is forced to rotate about a pin 258, connected to an eject support bracket 260, by the stress in the load spring 106 connected thereto. As the eject lever 252 rotates in the direction of arrow 262, it begins to transfer energy into a return spring 264 connected with a shorter lever arm 266 than the lever arm 268 of the load spring 106. When the eject lever 252 has reached the/ position shown in FIG. 13, it begins to also transfer the energy of the load spring 106 to the slide 132 by means of an eject link 270 connected to the eject lever by a pin 272 and the slide 132 by means of a sliding pin 274. The pin 274 slides in a slot 276 until it reaches the end 278 thereof wherein it starts to convert the energy of the spring 106 into movement in the direction of arrow 280 of the slide 132.

Figure 14:
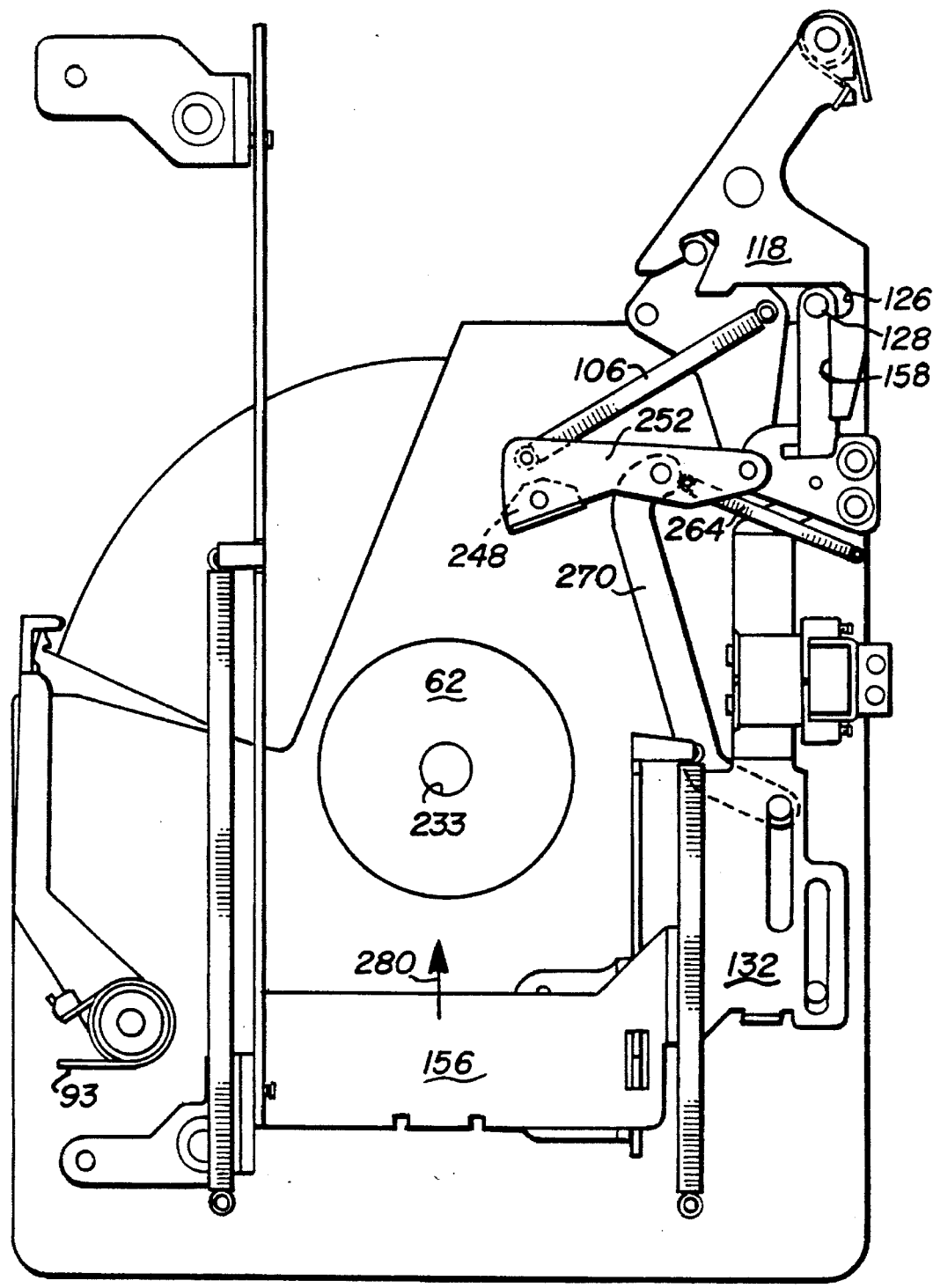
FIG. 14 is a bottom plan view of the insertion/ejection mechanism just as the eject lever unlatches the linkage.

Thereafter as the spring 106 forces the eject lever 252 to the position shown in FIG. 14, the slide 132 moves in the direction of arrow 280 moving the slots 213 and 214, which act on the pins 210 and 212 to retract the spindle 61. This is shown in FIG. 15. Each of the slots 213 and 214 include a linear cam surface portion 282 at a slightly lower angle than the linear cam surface portion 218. This is to assure that the left slide portion 144 and the right slide member 150 can break the spindle 61 away from the hub 62 against which it has been magnetically attracted for retraction through the hole 283 in the base 46. Thereafter, an arcuate cam surface portion 284 is used to accelerate the housing 196 back to the retracted position (FIG. 10A) maintained by the cam area 215. Compressed springs, spring 286 being shown about pin 198, can be used on all of the housing support pins 198, 200 and 202 to make sure that the housing 196 does not cock or tilt during either spindle extension or retraction.

Figure 16:
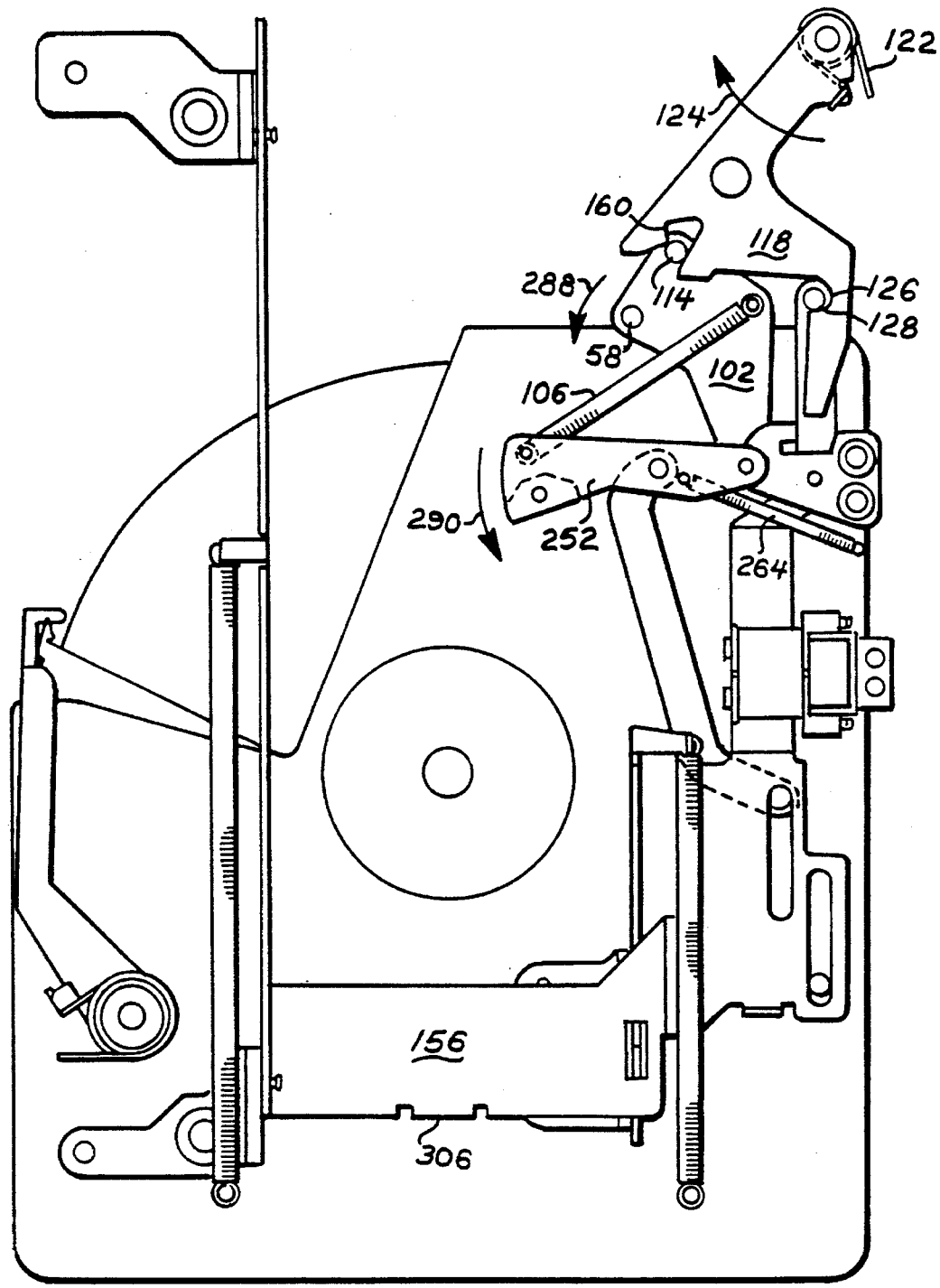
FIG. 16 is a bottom plan view of the insertion/ejection mechanism positioned an instant later than that position shown in FIG. 14, wherein the linkage is unlatched and applying force to eject the cartridge.
Figure 17:
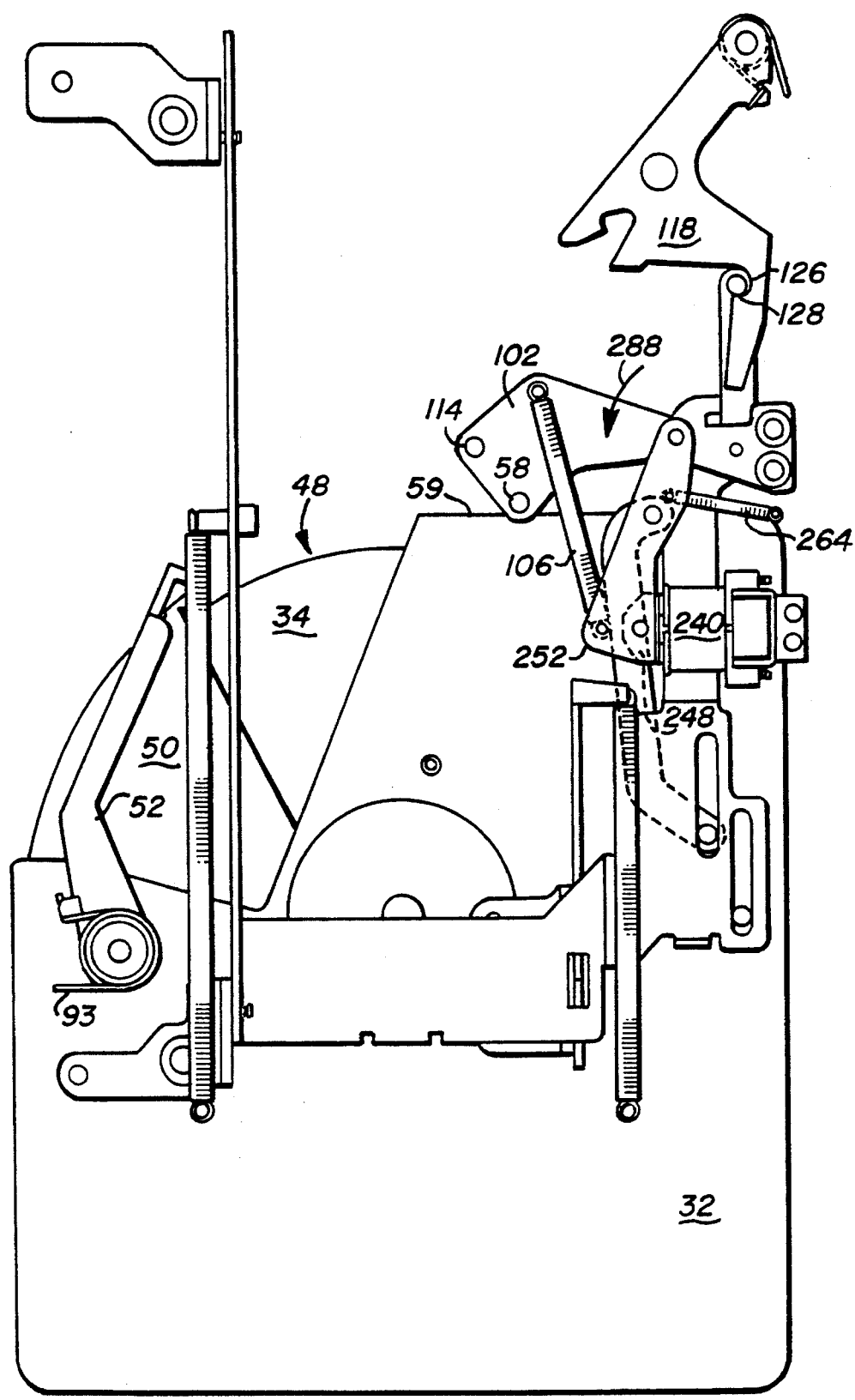
FIG. 17 is a bottom plan view of the insertion/ejection mechanism partially through the eject cycle with the trigger magnet armature relinked therewith.

Once the spindle 61 and the locator pin 230 have been retracted, the slide member 132 reaches a position where its control pin 128 no longer is engaged with the abutment surface 158. As shown in FIG. 14, this allows the latch 118 to be rotated in the direction of arrow 124 by the spring 122. The latch 118 then releases the latch pin 114 from escapement notch 160 (FIG. 16). This allows the remaining energy in the load spring 106 and the return spring 264 to start rotating the insertion lever 102 in the direction of arrow 288. As the insertion lever 102 begins to rotate in the direction of arrow 288 to start to eject the cartridge 32, the spring 264 overcomes the forces involved and starts rotating the eject lever 252 in the direction of arrow 290. After the eject lever 252 has rotated, the armature 248 reengages as is shown in FIG. 17. The remaining energy in the shutter opener arm spring 93 and the shutter spring 92 complete the ejection process. The total spring energy as it is available is shown in FIG. 11 by curve 300 whereas the force required to move the mechanism 100 through its various steps is shown by curve 302.

If it is desired to eject the cartridge 32 and electrical power is not available to trigger the trigger magnet 240, the mechanism 100 can be manually moved to eject the cartridge 32. This is done by sticking a pin or other long slender object through the emergency eject hole 66 and the soft rubber seal 304 covering it for engagement with a tab 306 on the cross portion 156 of the slide member 132. Movement of the slide 132 is resisted by the springs 136 and 138 but they are relatively easily overcome to move the slide 132 so that the pin 128 no longer prevents the latch member 118 from rotating in the direction of arrow 124 under the biasing of the spring 122. This releases the latch pin 114 from the escapement notch 160 and the full stored energy of the load spring 106 is applied to the back edge 59 of the cartridge 32 to eject it. The notch 126 thereafter holds the pin 128 to retain the slide 132 in the correct position for the next cartridge insertion.

When the ejection sequence is finished, the drive 30 is returned to the position shown in FIGS. 2A and 2B. Since the slide 132 is held against the force of the springs 136 and 138 by the pin 128 and the notch 126, the actuator lock lever 56 is back in position against the cam 57 so that the actuator arms 40 and 42 remain on the ramp 54. Thereafter the cartridge 32 is manually removed from the drive 30 and the spring loaded door 194 closes and seals the drive 30 as it does when there is a cartridge 32 inserted completely therein.

On most removable or nonremovable disk hard drives that use magnetic media, when the motor is turned off, the heads are landed on designated ring portions of the disk as the disk slows down and the air bearings on which the heads ride dissipate. These rings are never used for data storage since any media thereat eventually is damaged by contact with the heads. Since the heads land when there is still relative motion between them and the disk, bits of media can be abraded off the disk to contaminate the data storage areas thereof. Repeated landings can also damage the heads.

Figure 20:
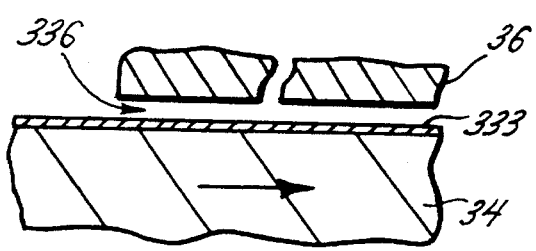
FIG. 20 is an enlarged detail view similar to FIG. 19 of a read/write head of the present invention as it normally flies over the disk.
Figure 19:
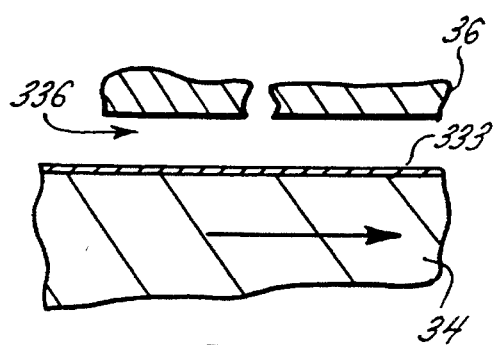
FIG. 19 is an enlarged detail view wherein the disk has been sped up for head launch from a parking ramp so that the read/write head is flying at a much higher than normal height.

In the present invention, as aforesaid, the arms 40 and 42 supporting the heads 36 and 38 are parked on the ramp 54 except when they are reading or writing on the disk 34 and the motor 60 is deenergized to save battery capacity. A microprocessor 330 controls the operation of the drive 30. When a read or write operation is to be performed, the microprocessor 330 causes a speed controller 332 to start the motor 60 and accelerate it to twice its normal speed. Since the heads 36 and 38 are not resting on the disk 34, the motor 60 is required to produce less torque than the motors of prior art drives, which must overcome friction between the heads and the disk so long as the disk has not reached sufficient speed to fly the heads thereof. Also, since the heads 36 and 38 never touch the disk 34 in the present drive 30, no area of the disk 34 need be reserved for head landing, making more of the magnetic media 333 of the disk 34 available for data storage. The high speed condition of the disk 34 causes any debris that might be on the disk 34 to be slung off. A filter 334 (FIG. 3) is positioned in alignment with the normal trajectory of the debris as it flies through the open window 48. After the motor 60 is up to speed, the microprocessor 330 signals a servo controller 335 to move the arms 40 and 42 off of the ramp 54. The high speed of the motor 60 establishes a thick, stiff air bearing 336 (FIG. 19) between the heads 36 and 38 and the disk 34 that prevents an arm 40 or 42 from springing off the ramp 54 and momentarily touching its attached head 36 or 38 onto the disk 34. As soon as the arms 40 and 42 are launched, the speed controller 332 slows down and locks the motor speed at the correct RPM for disk operation. Although this occurs in about 0.5 seconds, the reduction of speed and with it the reduction of the thickness of the air bearing 336 to its normal height allows the heads 36 and 38 to approach their normal flying height (FIG. 20) gradually. The whole launch sequence takes less than a second and is rarely noticed by an operator.

Very occasionally, dynamic vibrations during arm parking, due to aerodynamic interference between the ramp 54 and the arms 40 and 42, are strong enough to overpower the air bearing 336, when it is at its normal height, and cause a head 36 or 38 to contact the disk 34. Therefor the motor 60 may be sped up for the head unloading operations also.

When the drive 30 is stopped gracefully, such as under software control or by means of the eject button 65, the microprocessor 330 always parks the arms 40 and 42 on the ramp 54 and stops the disk 34 before energizing the trigger magnet 240. The spin down of the disk 34 is rapid, taking less than 0.5 seconds, because the back EMF of the motor 60 is shorted to dynamically brake it.

Figure 18:
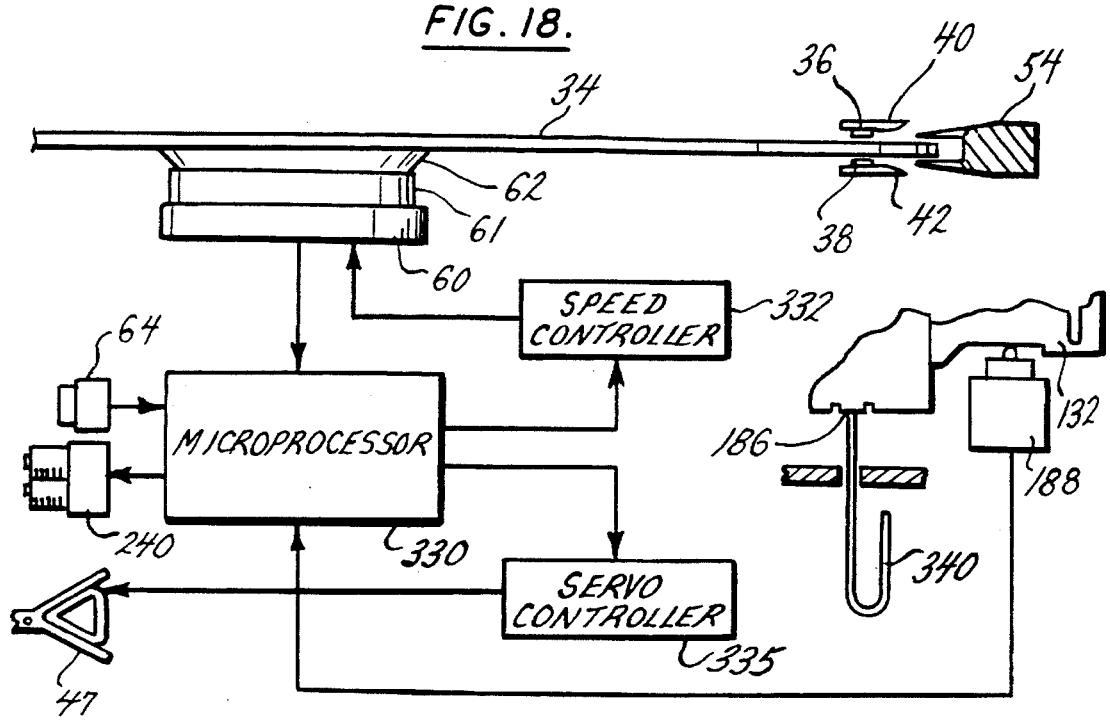
FIG. 18 is a diagrammatic representation of the speed control arrangement of the drive of the present invention.

If an operator uses the emergency eject procedure to manually eject a disk cartridge 32 when the disk 34 is being read or written upon and is spinning, damage could result. Therefore, when the operator inserts a pin shown as paper clip 340 in FIG. 18, into engagement with the tab 186 to move the slide member 132 and eject the disk 34, the first motion of the slide member 132 is sensed by the switch 188. The switch sends a signal to the microprocessor 330 to move the arms 40 and 42 onto the ramp 54, and then stop the disk 34 before the cartridge 32 begins to move. This is possible because of the very short time the drive 30 takes to park the heads 36 and 38 and to stop the disk 34. Normally, the disk is not sped up for this situation because the aforementioned unloading vibration is very rare and statistically it is unlikely to occur during the one or two miss-operations by the operator of this sort that can be expected during the lifetime of the drive.

Thus there has been shown and described a novel motor support assembly for a disk drive with removable cartridges which fulfills all of the objects and advantages sought therefor. Many changes, alterations, modifications and other uses and applications of the subject motor support assembly will become apparent to those skilled in the art after considering this specification together with the accompanying drawings. All such changes, alterations and other modifications which do not depart from the spirit and scope of the invention are deemed to be covered by the invention which is limited only by the claims that follow:

I claim:

1. A mechanism for a removable cartridge disk drive data storage system to connect a motor to the hub of a disk inside a removable cartridge including:
   a base having:
      a first side for supporting the removable cartridge; and
      a second side having:
         a plurality of positioning members extending from said second side generally perpendicular to said first side;
         a spindle opening defined by said base from said first side to said second side;
   first cam means;
   second cam means spaced from said first cam means; and
   a motor assembly including:
      a motor having:
         a spindle adapted for engagement with the hub of the disk in the removable cartridge;
      a motor housing retaining said motor, said motor housing defining:
         a plurality of orifices through which said plurality of positioning members extend, said first and second cam means connecting said motor housing for movement of said motor spindle between a retracted position away from said first side to an extended position through said spindle opening for engagement with the hub of the disk.

2. The mechanism as defined in claim 1 wherein said spindle includes:
   an axis of rotation, and said motor housing has:
   first and second housing sides, said first cam means being positioned on said first a housing side of said motor housing and said second cam means being positioned on said second housing side of said motor housing, said first and second cam means generally being positioned on a line passing through said axis of rotation.

3. The mechanism as defined in claim 2 wherein said first cam means include:
   a first cam follower extending from said first housing side; and
   a first cam member mounted for movement parallel to said first side of said base, said first cam member having:
      a first cam slot in engagement with said first cam follower shaped to extend and retract said spindle as said first cam member is moved parallel to said first side of said base, and wherein said second cam means include:
   a second cam follower extending from said second housing side; and
   a second cam member mounted for movement parallel to said first side of said base, said second cam member having:
      a second cam slot in engagement with said second cam follower shaped to extend and retract said spindle as said second cam member is moved parallel to said first side of said base.

4. The mechanism as defined in claim 3 wherein said first cam member includes:
   a first spring connected thereto to bias said first cam member to extend said spindle, and wherein said second cam member includes:
   a second spring connected thereto to bias said second cam member to extend said spindle.

5. The mechanism as defined in claim 4 further including:
   means connecting said first and second cam members together that allow slight independent motion between said first and second cam members.

6. The mechanism as defined in claim 3 wherein said first and second cam follower members are pins oriented generally parallel to said first side of said base and each other and that extend from said motor housing.

7. The mechanism as defined in claim 1 wherein said base defines:
   an orientation orifice, and wherein said motor housing includes:
   a cartridge orientation pin, said cartridge orientation pin being retracted from engagement with the cartridge when said spindle is retracted and being extended through said first and second sides of said base for engagement with the cartridge when said spindle is extended.

8. The mechanism as defined in claim 1 wherein said plurality of positioning members consist of at least two upstanding cylindrical pins each having a diameter, and wherein said each of said plurality of orifices is slightly larger than said cylindrical pin extending therethrough, said mechanism further including:
   a positioning spring on at least one of said upstanding cylindrical pins to bias said motor housing toward said base second surface.

9. The mechanism as defined in claim 1 wherein said first cam means include:
   a first cam follower extending from said motor housing; and
   a first cam member mounted for movement parallel to said first side of said base, said first cam member having:
      a first cam slot in engagement with said first cam follower shaped to extend and retract said motor as said first cam member is moved parallel to said first side of said base, and wherein, said second cam means include:
   a second cam follower extending from said motor housing; and
   a second cam member mounted for movement parallel to said first side of said base, said second cam member having:
      a second cam slot in engagement with said second cam follower shaped to extend and retract said motor as said second cam member is moved parallel to said first side of said base.

10. The mechanism as defined in claim 9 wherein said spindle includes:

an axis of rotation, said first and second cam means being positioned generally on opposite sides of said axis.

11. The mechanism as defined in claim 9 wherein said spindle includes:

an axis of rotation, and wherein each of said first and second cam slots includes:

a first cam portion generally perpendicular to said axis of rotation for maintaining said spindle retracted;

a second cam portion transitioning relatively abruptly from said first cam portion to an angle to said axis of rotation substantially less than 90° to quickly move said spindle toward the extended position; and a third cam portion transitioning relatively gently from said second cam portion at an angle relatively close to perpendicular to said axis of rotation to forcefully wedge said spindle into the extended position.

12. The mechanism as defined in claim 9 wherein said spindle includes:

an axis of rotation, and wherein each of said first and second cam slots includes:

an extending cam surface for moving said spindle from the retracted position to the extended position; and a retracting cam surface for moving said spindle from the extended position to the retracted position, said extending cam surface including:

a first extending cam surface portion generally perpendicular to said axis of rotation;

a second extending cam surface portion transitioning relatively abruptly from said first extending cam surface portion, said second extending cam surface portion being an arcuate surface starting at substantially less than 90° to quickly move said spindle toward the extended position and transitioning relatively close to perpendicular to said axis of rotation to forcefully wedge said spindle into the extended position, said retracting cam surface including:

a first retracting cam surface portion at an angle relatively close to perpendicular to said axis of rotation for forcefully wedging said spindle from the extended position;

a second retracting cam surface portion transitioning relatively rapidly from said first retracting cam surface portion to an angle to said axis of rotation substantially less than 90° to quickly move said spindle toward the retracted position; and a third retracting cam surface portion transitioning abruptly from said second retracting cam surface portion to an angle generally perpendicular to said axis of rotation to maintain said spindle in the retracted position.

13. The mechanism as defined in claim 12 wherein said first cam follower is a cylindrical member extending relatively parallel to said first side of said base, said first cam follower having a diameter that is less than the distance between at least part of said second extending cam portion and said second retracting cam portion.

14. A mechanism for a removable cartridge disk drive data storage system to connect a motor to the hub of a disk inside a removable cartridge including:

a base having:

a first side for supporting the removable cartridge; and a second side generally opposite said first side, said base defining:

a spindle opening;

first cam means;

second cam means spaced from said first cam means;

a motor assembly including:

a motor having:

a spindle adapted for engagement with the hub of the disk in the removable cartridge; and a motor housing retaining said motor; and means to allow movement of said motor housing generally perpendicular to said first side and to allow slight movements generally parallel to said first side, said first and second cam means connecting said motor housing to said base for causing movement of said motor spindle between a retracted position away from said first side to an extended position through said spindle opening for engagement with the hub of the disk.

15. The mechanism as defined in claim 14 wherein said spindle includes:

an axis of rotation, and wherein said motor housing includes:

first and second housing sides, said first cam means being positioned on said first housing side of said motor housing and said second cam means being positioned on said second housing side of said motor housing, said first and second cam means generally being positioned on a line passing through said axis of rotation.

16. The mechanism as defined in claim 15 wherein said first cam means include:

a first cam follower extending from said first housing side; and a first cam member mounted for movement with respect to said base, said first cam member having:

a first cam slot in engagement with said first cam follower shaped to extend and retract said spindle, motor, and motor housing as said first cam member is moved, and wherein said second cam means include:

a second cam follower extending from said second housing side; and a second cam member mounted for movement with respect to said base, said second cam member having:

a second cam slot in engagement with said second cam follower shaped to extend and retract said spindle, motor, and motor housing as said second cam member is moved.

17. The mechanism as defined in claim 16 wherein said first and second cam follower members are pins oriented generally parallel to said first side of said base and each other.

18. The mechanism as defined in claim 16 wherein said first cam member includes:

a first spring connected thereto to bias said first cam member to extend said spindle, and wherein said second cam member includes:

a second spring connected thereto to bias said second cam member to extend said spindle.

19. The mechanism as defined in claim 18 further including:

means loosely connecting said first and second cam members that allow slight motion between first and second cam members.

20. The mechanism as defined in claim 14 wherein said base defines:

a orientation orifice, and wherein said motor housing includes:

a cartridge orientation pin, said cartridge orientation pin being retracted to a position out of engagement with the cartridge when said spindle is retracted and being extended through said first and second sides of said base for engagement with the cartridge when said spindle is extended.

21. The mechanism as defined in claim 20 wherein said means to allow movement of said motor housing generally perpendicular to said first side include:
   at least two upstanding cylindrical pins, each having:
      a diameter, and
   a like number of orifices through said motor housing through which said cylindrical pins extend, each orifice having:
      an opening slightly larger than said cylindrical pin extending therethrough, said mechanism further including;
   a positioning spring on at least one of said upstanding cylindrical pins to bias said motor housing toward said base second surface.

22. The mechanism as defined in claim 14 wherein said first cam means include:
   a first cam follower extending from said motor housing; and
   a first cam member mounted for movement with respect to said first cam follower, said first cam member having:
      a first cam slot having:
         sides positioned for engagement with said first cam follower, said first cam slot being shaped to extend and retract said spindle as said first cam member is moved, and wherein, said second cam means include:
   a second cam follower extending from said motor housing; and
   a second cam member mounted for movement with respect to said second cam follower, said second cam member having:
      a second cam slot having:
         sides positioned for engagement with said second cam follower, said second cam slot being shaped to extend and retract said spindle as said second cam member is moved.

23. The mechanism as defined in claim 22 wherein said spindle includes:
   an axis of rotation, said first and second cam followers each being a pin positioned generally on a line that passes through said axis of rotation.

24. The mechanism as defined in claim 22 wherein said spindle includes:
   an axis of rotation, and wherein each of said first and second cam slots includes:
   a first cam portion generally perpendicular to said axis of rotation for maintaining said spindle retracted;
   a second cam portion transitioning relatively abruptly from said first cam portion to an angle to said axis of rotation substantially less than 90° to quickly move said spindle toward the extended position; and
   a third cam portion transitioning relatively gently from said second cam portion at an angle relatively close to perpendicular to said axis of rotation to forcefully wedge said spindle into the extended position.

25. The mechanism as defined in claim 22 wherein said spindle includes:
   an axis of rotation, and wherein each of said first and second cam slots includes:
   an extending cam surface for moving said spindle from the retracted position to the extended position; and
   a retracting cam surface for moving said spindle from the extended position to the retracted position, said extending cam surface including:
      a first extending cam surface portion generally perpendicular to said axis of rotation;
      a second extending cam surface portion transitioning relatively abruptly from said first extending cam surface portion, said second extending cam surface portion being an arcuate surface starting at substantially less than 90° to quickly move said spindle toward the extended position and transitioning relatively gently toward perpendicular to said axis of rotation to forcefully wedge said spindle into the extended position, said retracting cam surface including:
      a first retracting cam surface portion at an angle relatively close to perpendicular to said axis of rotation for forcefully wedging said spindle from the extended position;
      a second retracting cam surface portion transitioning relatively rapidly from said first retracting cam surface portion to an angle to said axis of rotation substantially less than 90° to quickly move said spindle toward the retracted position; and
      a third retracting cam surface portion transitioning abruptly from said second retracting cam surface portion to an angle generally perpendicular to said axis of rotation to maintain said spindle in the retracted position.

26. The mechanism as defined in claim 25 wherein said first cam follower is a cylindrical member extending relatively parallel to said first side of said base, said first cam follower having a diameter that is less than the distance between at least part of said second extending cam portion and said second retracting cam portion.

27. A mechanism for a removable cartridge disk drive data storage system to connect a motor to the hub of a disk positioned inside a removable cartridge including:
   a motor assembly including:
      a motor having:
         a spindle adapted for engagement with the hub, said spindle having:
            a axis of rotation; and
         a motor housing retaining said motor;
   means to allow restricted generally linear movement of said motor housing between a retracted position with said spindle disengaged from the hub and an extended position with said spindle engaged with the hub while allowing slight movement at right angles to the generally linear movement;
   first cam means; and
   second cam means spaced from said first cam means, said first and second cam means being connected to said motor housing to cooperate and move said motor spindle between the retracted position and the extended position.

28. The mechanism as defined in claim 27 wherein said motor housing includes:
   first and second housing sides, said first cam means being positioned on said first housing side of said motor housing and said second cam means being positioned on said second housing side of said motor housing, said first and second cam means generally being positioned on a line passing through said axis of rotation.

29. The mechanism as defined in claim 28 wherein said first cam means include:

a first cam follower extending from said first housing side; and a first cam member mounted for movement generally perpendicular to said axis of rotation, said first cam member having:
  a first cam slot having:
    a pair of walls positioned for engagement with said first cam follower and shaped to extend and retract said spindle as said first cam member is moved perpendicular to said axis of rotation, and wherein said second cam means include:

a second cam follower extending from said second housing side; and a second cam member mounted for movement generally perpendicular to said axis of rotation, said second cam member having:
  a second cam slot having:
    a pair of walls positioned for engagement with said second cam follower and shaped to extend and retract said spindle as said second cam member is moved perpendicular to said axis of rotation.

30. The mechanism as defined in claim 29 wherein said first and second cam follower members are pins oriented generally perpendicular to said axis of rotation and parallel to each other.

31. The mechanism as defined in claim 29 wherein said first cam member includes:

a first spring connected thereto to bias said first cam member to extend said spindle, and wherein said second cam member includes:

a second spring connected thereto to bias said second cam member to extend said spindle.

32. The mechanism as defined in claim 31 further including:

means connecting said first and second cam members and allowing slight motion therebetween, said first cam member including:
  an abutment surface adapted for application of manual force thereto to move said first and second cam members to retract said spindle.

33. The mechanism as defined in claim 27 wherein said motor housing includes:

a cartridge orientation pin, said cartridge orientation pin being retracted from engagement with the cartridge when said spindle is retracted and being extended for engagement with the cartridge when said spindle is extended.

34. The mechanism as defined in claim 27 wherein said means to allow restricted movement of said motor housing include:

at least two upstanding cylindrical pins, each having:
  a diameter, and
a like number of orifices through said motor housing through which said cylindrical pins extend, each orifice having:
  a diameter slightly larger than said diameter of said cylindrical pin extending therethrough, whereby said motor housing can move along said upstanding cylindrical pins and tilt slightly with respect thereto.

35. The mechanism as defined in claim 27 wherein said first cam means include:

a first cam follower extending from said motor housing; and a first cam member mounted for movement with respect to said motor housing, said first cam member having:
  a first cam slot operatively connected to said first cam follower and shaped to extend and retract said spindle as said first cam member is moved, and wherein, said second cam means include:

a second cam follower extending from said motor housing; and a second cam member mounted for movement with respect to said motor housing, said second cam member having:
  a second cam slot operatively connected to said second cam follower and shaped to extend and retract said spindle as said second cam member is moved.

36. The mechanism as defined in claim 35 wherein said first and second cam followers are positioned generally on a line through said axis of rotation.

37. The mechanism as defined in claim 35 wherein each of said first and second cam slots includes:

a first cam wall portion generally perpendicular to said axis of rotation for maintaining said spindle retracted;

a second cam wall portion transitioning relatively abruptly from said first cam wall portion to an angle to said axis of rotation substantially less than 90° to quickly move said spindle toward the extended position; and a third cam wall portion transitioning relatively gently from said second cam wall portion at an angle relatively close to perpendicular to said axis of rotation to forcefully wedge said spindle into the extended position.

38. The mechanism as defined in claim 27 wherein said first cam means include:

a first cam follower; and a first cam member mounted for movement, said first cam member having:
  a first cam slot, and wherein said second cam means include:

a second cam follower; and a second cam member mounted for movement, said second cam member having:
  a second cam slot, each of said first and second cam slots including:
    an extending cam surface for moving said spindle from the retracted position to the extended position; and
    a retracting cam surface for moving said spindle from the extended position to the retracted position, said extending cam surface including:
      a first extending cam surface portion generally perpendicular to said axis of rotation;
      a second extending cam surface portion transitioning relatively abruptly from said first extending cam surface portion, said second extending cam surface portion being an arcuate surface starting at substantially less than 90° to quickly move said spindle toward the extended position and transitioning relatively gently toward perpendicular to said axis of rotation to forcefully wedge said spindle into the extended position, and said retracting cam surface including:
      a first retracting cam surface portion at an angle relatively close to perpendicular to said axis of rotation for forcefully wedging said spindle from the extended position;

a second retracting cam surface portion transitioning relatively rapidly from said first retracting cam surface portion to an angle to said axis of rotation substantially less than 90° to quickly move said spindle toward the retracted position; and a third retracting cam surface portion transitioning abruptly from said second retracting cam surface portion to an angle generally perpendicular to said axis of rotation to maintain said spindle in the retracted position.

39. The mechanism as defined in claim 38 wherein said first cam follower is a cylindrical member extending relatively perpendicular to said axis of rotation, said first cam follower having a diameter that is less than the distance between at least part of said second extending cam portion and said second retracting cam portion.

40. The mechanism as defined in claim 27 wherein said cam means include:

a cam follower; and a cam member mounted for movement, said cam member having:

an extending cam surface for moving said spindle from the retracted position to the extended position; and a retracting cam surface for moving said spindle from the extended position to the retracted position, said extending cam surface including:

a first extending cam surface portion generally perpendicular to said axis of rotation;

a second extending cam surface portion transitioning relatively abruptly from said first extending cam surface portion, said second extending cam surface portion being an arcuate surface starting at substantially less than 90° to quickly move said spindle toward the extended position and transitioning relatively gently toward perpendicular to said axis of rotation to forcefully wedge said spindle into the extended position, and said retracting cam surface including:

a first retracting cam surface portion at an angle relatively close to perpendicular to said axis of rotation for forcefully wedging said spindle from the extended position;

a second retracting cam surface portion transitioning relatively rapidly from said first retracting cam surface portion to an angle to said axis of rotation substantially less than 90° to quickly move said spindle toward the retracted position; and a third retracting cam surface portion transitioning abruptly from said second retracting cam surface portion to an angle generally perpendicular to said axis of rotation to maintain said spindle in the retracted position.

41. A mechanism for a removable cartridge disk drive data storage system to magnetically connect a motor to the hub of a disk positioned inside a removable cartridge including:

a motor assembly including:

a motor having:

a spindle adapted for magnetic engagement with the hub, said spindle having:

a axis of rotation; and a permanent magnet positioned to magnetically engage the hub; and a motor housing retaining said motor;

means to allow linear movement of said motor housing between a retracted position with said spindle disengaged from the hub and an extended position with said spindle engaged with the hub and to allow slight adjusting movements other than the linear movement to assure that said spindle can engage the hub; and cam means connected to said motor housing to move said motor spindle between the retracted position and the extended position.

42. The mechanism as defined in claim 41 wherein said motor housing includes:

a cartridge orientation pin fixedly attached thereto, said cartridge orientation pin being retracted from engagement with the cartridge when said spindle is retracted and being extended for engagement with the cartridge when said spindle is extended.

43. The mechanism as defined in claim 41 wherein said means to allow linear movement of said motor housing include:

at least two upstanding cylindrical pins, each having:

a diameter, and a like number of orifices through said motor housing through which said cylindrical pins extend, each orifice having:

an opening slightly larger than said cylindrical pin extending therethrough, whereby said motor housing can move along said upstanding cylindrical pins and tilt slightly with respect thereto.

\* \* \* \* \*